US012176654B2

(12) United States Patent
Mase et al.

(10) Patent No.: US 12,176,654 B2
(45) Date of Patent: Dec. 24, 2024

(54) CONNECTOR WITH DETECTOR AND LOCK ARM

(71) Applicant: SUMITOMO WIRING SYSTEMS, LTD., Yokkaichi (JP)

(72) Inventors: Tsuyoshi Mase, Yokkaichi (JP); Toshihiro Ito, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 361 days.

(21) Appl. No.: 17/790,673

(22) PCT Filed: Dec. 23, 2020

(86) PCT No.: PCT/JP2020/048070
§ 371 (c)(1),
(2) Date: Jul. 1, 2022

(87) PCT Pub. No.: WO2021/145171
PCT Pub. Date: Jul. 22, 2021

(65) Prior Publication Data

US 2023/0042440 A1 Feb. 9, 2023

(30) Foreign Application Priority Data

Jan. 13, 2020 (JP) ................................ 2020-003306

(51) Int. Cl.
*H01R 13/641* (2006.01)
*H01R 13/629* (2006.01)

(52) U.S. Cl.
CPC ..... *H01R 13/641* (2013.01); *H01R 13/62938* (2013.01)

(58) Field of Classification Search
CPC ............ H01R 13/641; H01R 13/62938; H01R 13/639; H01R 13/6295
USPC .................................................. 439/352, 157
See application file for complete search history.

(56) References Cited

U.S. PATENT DOCUMENTS 5,928,010 A * 7/1999 Katsuma .......... H01R 13/62933 439/157
6,247,957 B1 6/2001 Hasegawa
6,328,582 B1 * 12/2001 Fukamachi .......... H01R 13/642 439/157
2003/0082940 A1 * 5/2003 Yamashita ....... H01R 13/62977 439/157
2003/0190836 A1 * 10/2003 Yamashita ........... H01R 13/641 439/489

(Continued)

FOREIGN PATENT DOCUMENTS

JP 2000-243516 A 9/2000
JP 2003-187910 A 7/2003

(Continued)

OTHER PUBLICATIONS

Mar. 23, 2021 International Search Report issued in International Patent Application No. PCT/JP2020/048070.

*Primary Examiner* — Marcus E Harcum
(74) *Attorney, Agent, or Firm* — Oliff PLC

(57) ABSTRACT

A connector including a housing; a lock arm that holds the housing and a counterpart housing in a fitted state; and a detector that is in a state of being movable with respect to the lock arm when the housing and the counterpart housing are properly fitted, wherein: the detector is arranged at one side surface among two side surfaces of the lock arm.

3 Claims, 19 Drawing Sheets

(56) References Cited

U.S. PATENT DOCUMENTS

| | | | | |
|---|---|---|---|---|
| 2006/0281351 | A1* | 12/2006 | Yamaoka | H01R 13/62938 439/157 |
| 2007/0072482 | A1* | 3/2007 | Fujii | H01R 13/62938 439/489 |
| 2007/0199369 | A1* | 8/2007 | Tsuji | H01R 13/62927 73/40.7 |
| 2010/0048053 | A1* | 2/2010 | Tonosaki | H01R 13/62938 439/299 |
| 2016/0204538 | A1 | 7/2016 | Matsuura | |
| 2016/0261069 | A1 | 9/2016 | Noro et al. | |
| 2017/0365950 | A1* | 12/2017 | Matsuura | H01R 13/64 |
| 2019/0044278 | A1* | 2/2019 | Amemiya | H01R 13/641 |

FOREIGN PATENT DOCUMENTS

| | | | |
|---|---|---|---|
| JP | 2008-210652 | A | 9/2008 |
| JP | 2020-027720 | A | 2/2020 |

* cited by examiner

CONNECTOR WITH DETECTOR AND LOCK ARM

BACKGROUND

This disclosure relates to a connector.

The connector disclosed in JP2003-187910A has a male housing and a female housing that can fit together, and a detection member that is assembled into the female housing. The female housing has a bendingly deformable lock lever (lock arm) that holds both housings in a fitted state. The female housing has a mounting groove on a lower side (displacement space side) of the lock lever to accommodate the detection member. The detection member is arranged so as to be able to move from a standby position to an advance position with respect to the female housing. If the detection member is movable to the advance position, it is detected that the lock lever has elastically returned from the displacement space and is locked, that is, it is detected that both housings are properly fitted.

The connector disclosed in JP2015-88274A has a lever rotatably installed in the female connector housing. The lever has a lock arm. In the configuration of the connector disclosed in JP2015-88274A, it is also possible to provide a member that corresponds to the above detection member.

SUMMARY

In JP2003-187910A, since the mounting groove that accommodates the detection member is arranged at the lower side of the lock lever, there is a concern that the connector may become larger in the vertical direction. Additionally, in JP2003-187910A, when moving the detection member, a handle portion is held. This handle portion protrudes into the back portion of the female housing. Thus, there is also a concern that the connector will become larger in the front/rear direction (fitting direction).

An exemplary aspect of the disclosure provides a connector that can avoid an increase in size due to the presence of the detection member.

The connector of this disclosure has a housing, a lock arm that holds the housing and a counterpart housing in a fitted state, and a detector that that is in a state of being movable with respect to the lock arm when the housing and the counterpart housing are properly fitted. The detector is arranged on one of the two sides of the lock arm.

According to this disclosure, a connector can be provided that can avoid an increase in size due to the presence of the detector.

DETAILED DESCRIPTION OF EMBODIMENTS

Explanation of Embodiments of this Disclosure

Figure 1:
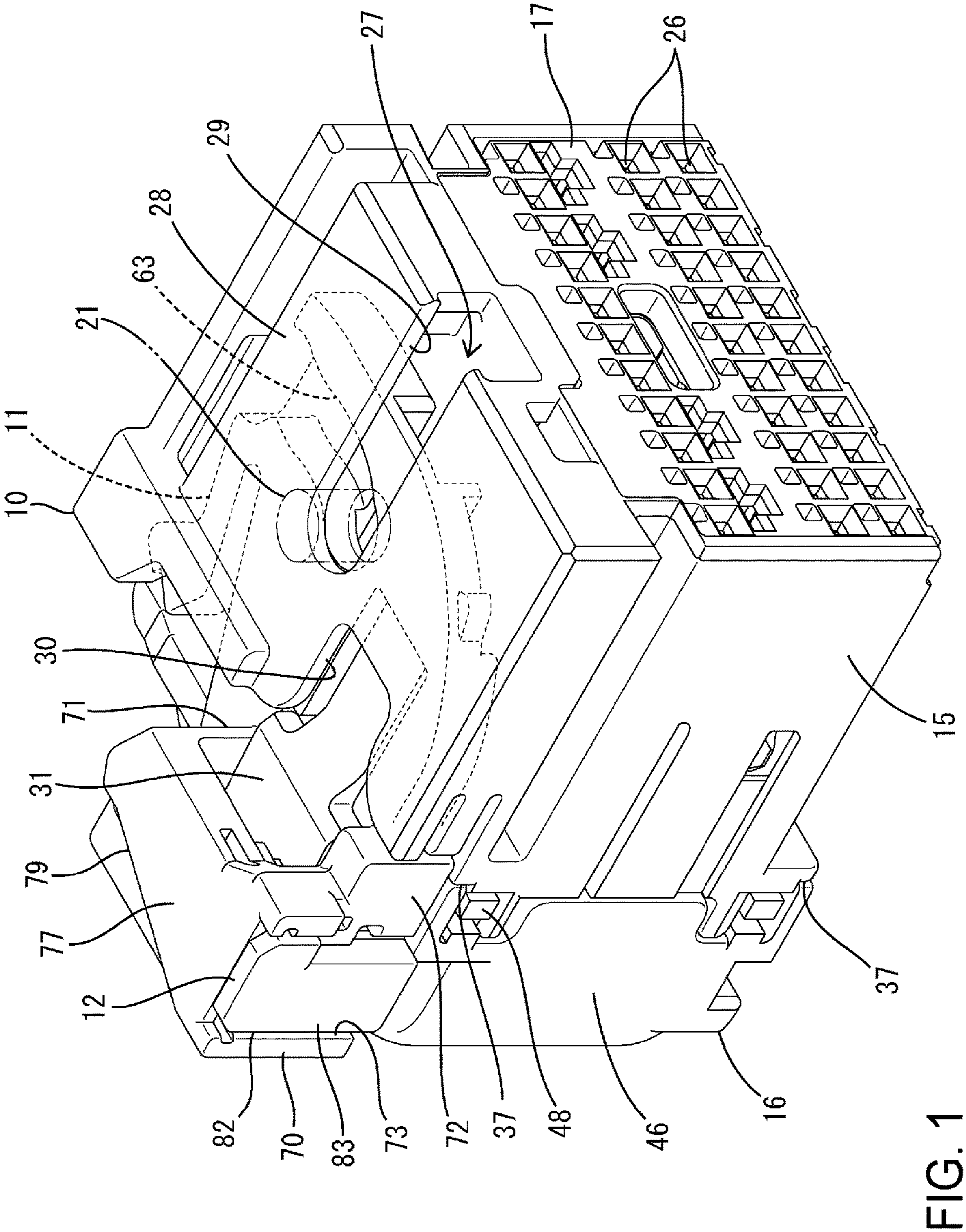
FIG. 1 is a perspective view of a connector in this embodiment.

First, embodiments of this disclosure will be listed and described.

(1) A connector of this disclosure includes: a housing; a lock arm that holds the housing and a counterpart housing in a fitted state; and a detection member that that is in a state of being movable with respect to the lock arm when the housing and the counterpart housing are properly fitted, wherein: the detection member is arranged at one side surface side among two side surfaces of the lock arm. According to this configuration, since the detection member is arranged at, and closely against, one side surface side of the lock arm, it is possible to suppress the connector from becoming large in the length direction and the bending direction of the lock arm.

(2) The connector according to claim 1, wherein:

It is preferable that the detection member is in a state of being movable from the one side surface side toward another side surface side with respect to the lock arm when the housing and the counterpart housing are properly fitted. According to this configuration, the detection member can move to the other side of the lock arm to detect that both housings are properly fitted.

(3) It is preferable that a protective wall is placed at a side of the one side surface of the lock arm and that the protective wall has a mounting portion that movably holds the detection member. According to this configuration, the protective wall can have both a protective function for protecting the lock arm from the side and a holding function for holding the detection member. Thus, the connector configuration may be simplified as compared with the case in which portions having the protective function and the holding function are provided separately. Furthermore, this can further suppress the increase in size of the connector.

(4) It is preferable that a lever is provided that advances the fitting of the housing and the counterpart housing, the lock arm is provided at the lever, and the detection member is held by the lever. According to this configuration, the housing configuration can be simplified.

(5) Preferably the lever has a frame portion that covers the lock arm, and is rotated in a fitting direction when the fitting of the housing and the counterpart housing is advanced; the frame portion of the lever has a lever pressing surface that is exposed rearward in the fitting direction; the detection member has a flat plate-shaped base portion and can move in a detection direction with respect to the lock arm when the housing and the counterpart housing are properly fitted; the base portion of the detection member has a detection member pressing surface that is exposed rearward in the detection direction; and the lever pressing surface and the detection member pressing surface face different directions from each other. According to this configuration, when the lever is rotated in the fitting direction, the lever pressing surface can be pressed without contacting the detection member pressing surface. Further, when the detection member is moved in the detection direction, the detection member pressing surface can be pressed without contacting the lever pressing surface. Therefore, the lever rotation and the detection member movement can be performed without interfering with each other.

Details of Embodiments of this Disclosure

Specific examples of a connector of this disclosure will be described below with reference to the drawings. This disclosure is not limited to these examples, and is indicated by the scope of claims, and is intended to include all modifications within the meaning and scope equivalent to the scope of claims.

Figure 2:
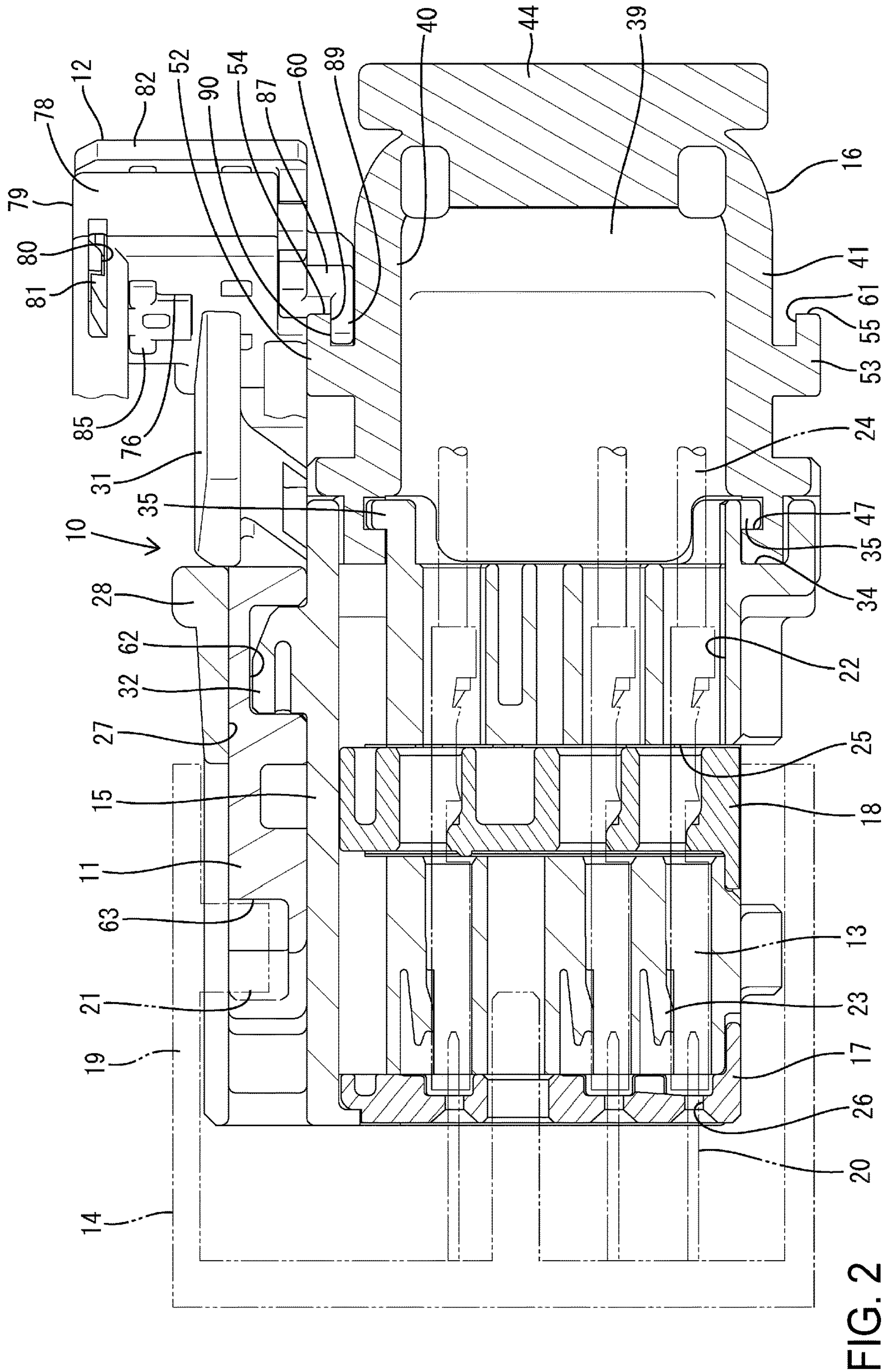
FIG. 2 is a side cross-sectional view of the connector with a lever in a temporary engagement position.

As shown in FIG. 2, a connector in this embodiment has a connector body 10, a lever 11, a detection member 12 (detector), and terminal fittings 13. The connector body 10 can be fitted with a counterpart housing 14. The connector body 10 has a housing 15, a cover 16, a front holder 17, and a retainer 18. The connector body 10 is a part responsible for housing and holding the terminal fittings 13 and wires 24 connected to the terminal fittings 13. In the following description, a front side is a side in which the connector body 10 and the counterpart housing 14 face each other at the start of fitting. An up/down direction is based on an up/down direction in each of FIGS. 1-3. Directions defined in this specification do not necessarily need to match actual directions.

<Counterpart Housing>

The counterpart housing 14 is made of synthetic resin and has a tubular hood portion 19 as shown in FIG. 2. A plurality of tab-shaped male terminal fittings 20 project and are arranged in the hood portion 19. The hood portion 19 has a cylindrical cam follower 21 projecting at an inner surface of an upper wall. The counterpart housing 14 is fixed to an undepicted circuit board. A rear portion of each of the male terminal fittings 20 is connected to a conductive portion of the circuit board at the outside of the hood portion 19.

<Housing, Terminal Fittings, Retainer, Front Holder>

Figure 3:
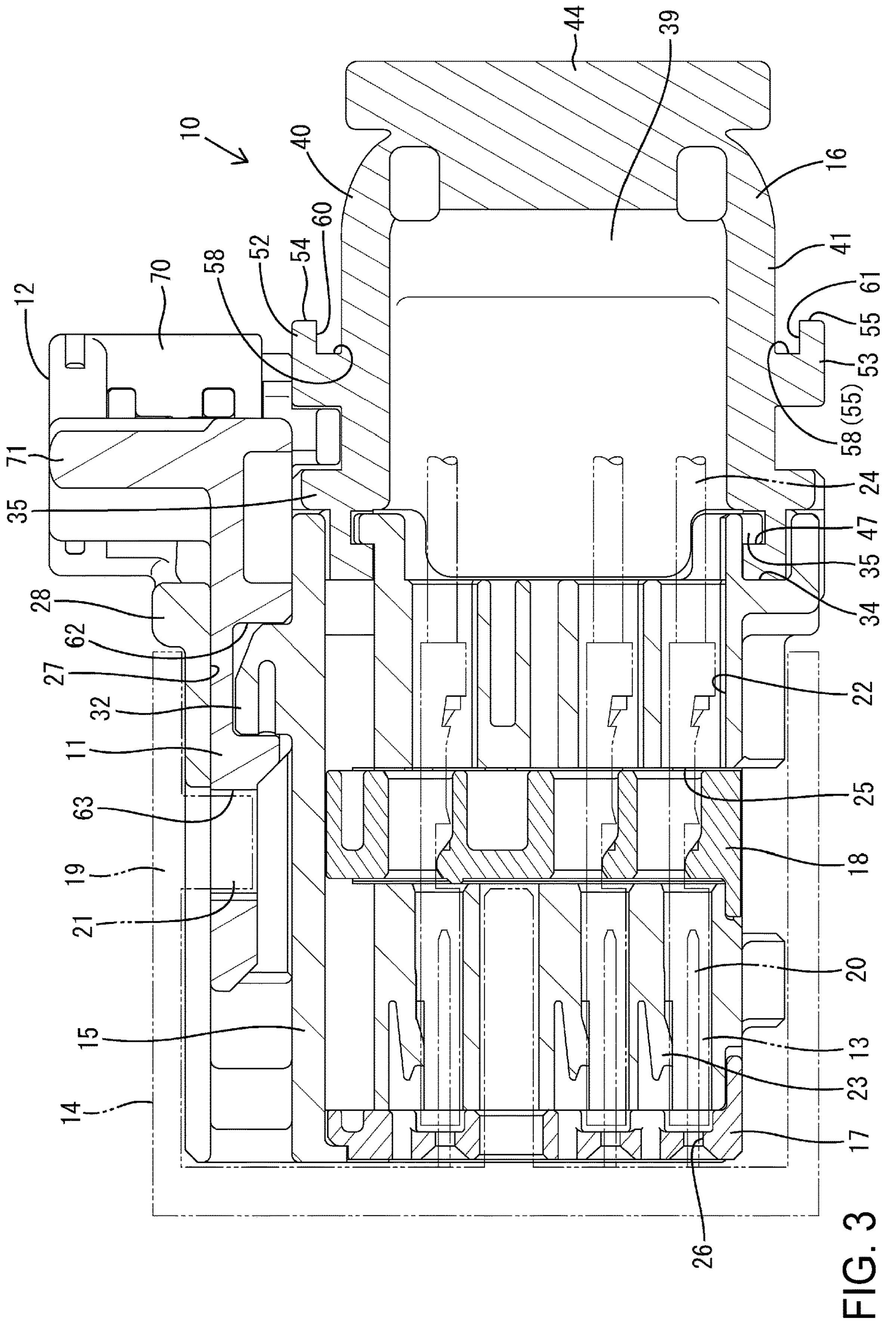
FIG. 3 is a side cross-sectional view of the connector with the lever in a permanent engagement position.

The housing 15 is made of synthetic resin, has an angular block shape, and is fitted in the hood portion 19 as shown in FIGS. 2 and 3. The housing 15 has a plurality of cavities 22 inside. Each cavity 22 is formed to penetrate in a front/rear direction in the housing 15. The housing 15 has a lance 23 projecting forward on an inner wall of each cavity 22.

The terminal fittings 13 are inserted into respective cavities 22 of the housing 15 from the rear. The terminal fittings 13 are temporarily locked by the lances 23 in the cavities 22.

The terminal fittings 13 are female terminal fittings, and are formed by bending or the like of a conductive metal plate. When the connector body 10 and the counterpart housing 14 are fitted together, front portions of the male terminal fittings 20 are inserted and connected to box-shaped portions at the front side of the terminal fittings 13. The terminal fittings 13 are electrically and mechanically connected to terminal portions of the wires 24.

The housing 15 has a retainer mounting hole 25 that extends in the up/down direction and is open at its lower surface. The retainer mounting hole 25 communicates with each cavity 22. A retainer 18 is inserted into the retainer mounting hole 25 of the housing 15 from below. The terminal fittings 13 are secondarily locked by the retainer 18 and are securely held so as not to slip out of the housing 15.

A front holder 17 is attached to the housing 15. The front holder 17 has a front wall portion that covers a front surface of the housing 15. The front wall portion of the front holder 17 has a plurality of male terminal insertion holes 26 at positions communicating with each cavity 22. The male terminal fittings 20 are inserted into the male terminal insertion holes 26 and connected to the terminal fittings 13.

Figure 4:
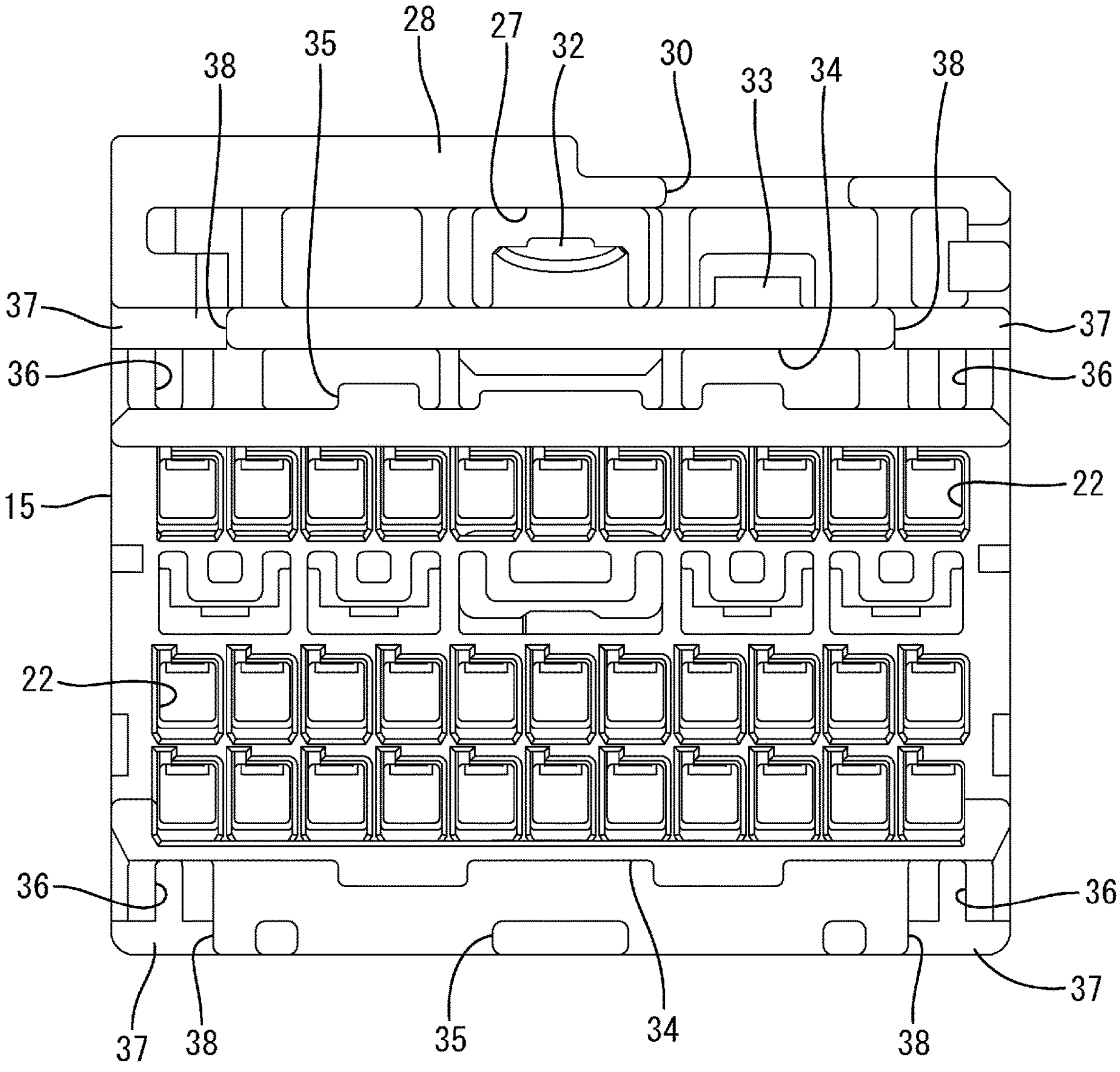
FIG. 4 is a rear view of a housing.

The housing 15 has a lever housing chamber 27 at an upper end portion above a formation area of each cavity 22 and a mounting area of the front holder 17. As shown in FIG. 4, the lever housing chamber 27 has a flat pocket shape in a width direction and is open at the rear surface of the housing 15.

The housing 15 has an upper wall portion 28 that partitions an upper surface of the lever housing chamber 27. As shown in FIG. 1, the upper wall portion 28 has, at its central portion in the width direction, a cam follower insertion groove 29 extending in the front/rear direction and opening at the front surface of the housing 15. The cam follower 21 of the counterpart housing 14 is inserted into the cam follower insertion groove 29. Further, the upper wall portion 28 has an arm release portion 30 recessed in a concave shape at a rear end edge on one side in the width direction (left side in FIG. 1). A lock arm 31, which will be described later, enters and is released inside the arm release portion 30 (see FIG. 14).

As shown in FIG. 4, the housing 15 has a cylindrical shaft portion 32 protruding at the center, in the width direction, of the bottom surface of the lever housing chamber 27. The shaft portion 32 rotatably supports the lever 11. The housing 15 also has a claw-shaped lock portion 33 protruding at one side of the lower surface of the lever housing chamber 27 in the width direction. The lock portion 33 has a protruding dimension smaller than that of the shaft portion 32. The lock portion 33 is arranged so as to face the arm release portion 30 at a position close to the rear end of the lever housing chamber 27.

As shown in FIG. 4, the housing 15 has openings in the rear face for upper and lower rail portions 34 along the width direction. The upper rail portion 34 is arranged below the lever housing chamber 27. The lower rail portion 34 is arranged at the lower end of the housing 15. The formation area of each cavity 22 is positioned between two rail portions 34. Both rail portions 34 are slit-shaped, extending across the full width of the housing 15. Both rail portions 34 have meshing portions 35 at a plurality of locations along the extension direction. As shown in FIG. 2, the meshing portions 35 have an L-shaped cross section when viewed from the extension direction of the rail portions 34.

Additionally, as shown in FIG. 4, both rail portions 34 have linear groove-shaped locking receiving portions 36 along the up/down direction at the interior surface on both ends in the width direction (extension direction). The cover 16 is slid and mounted with respect to the housing 15 along both rail portions 34, and the locking receiving portions 36 restrict the sliding operation, and the meshing portions 35 restrict detachment from the rail portions 34.

As shown in FIGS. 1 and 4, the housing 15 has a pair of upper and lower notch portions 37 at positions near the four corners on the rear surface. Each notch portion 37 is arranged at a position close to a respective one of the locking receiving portions 36 of the two rail portions 34. Each upper notch portion 37 is arranged so as to communicate with the lever housing chamber 27. Each notch portion 37 is open rearward and laterally, and has a stopper portion 38 along the up/down direction at the inner side surface. The stopper portions 38 stop the sliding operation of the cover 16.

<Cover>

Figure 5:
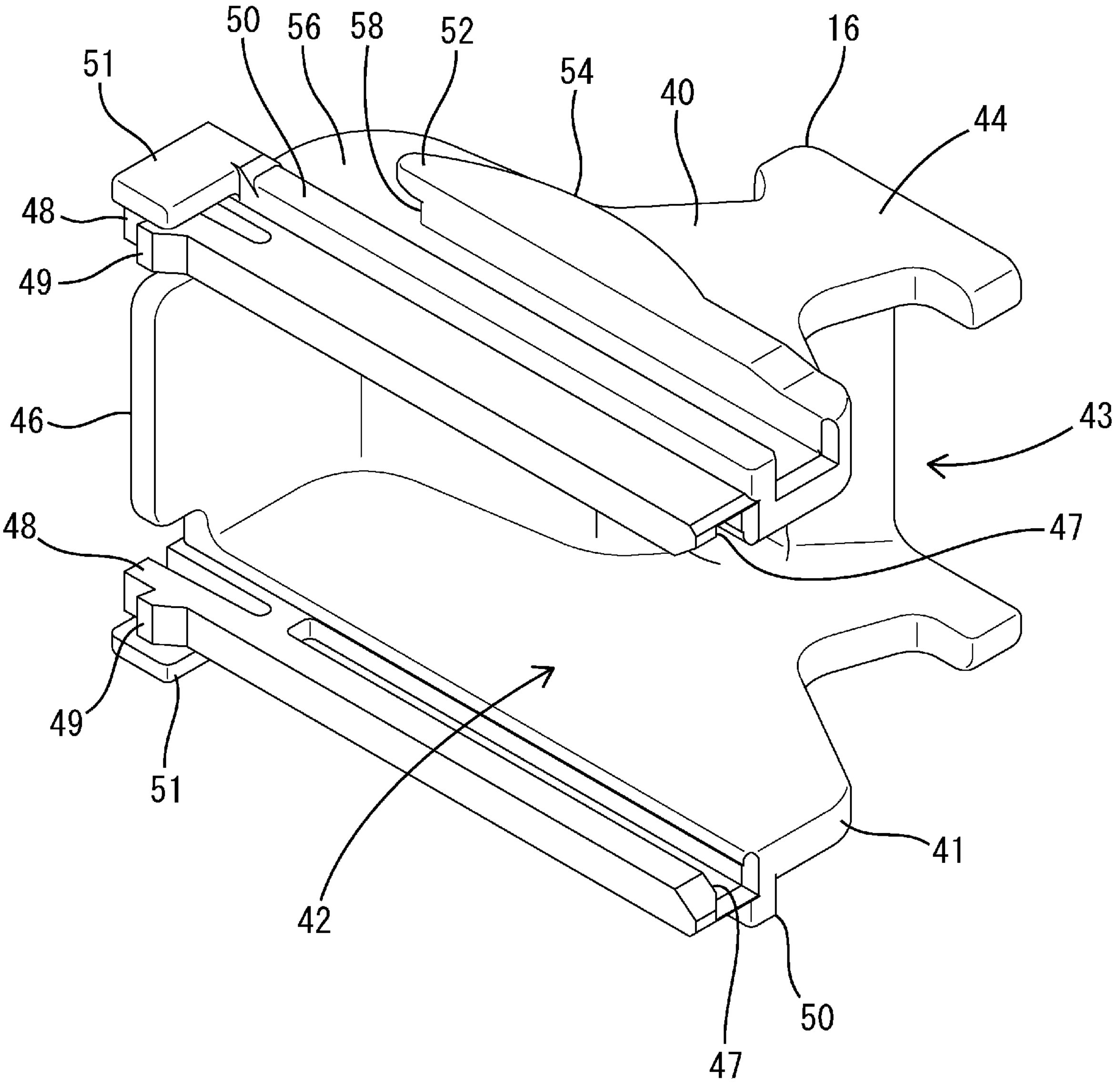
FIG. 5 is a perspective view of a cover in which one opposing surface is arranged at an upper surface side.
Figure 6:
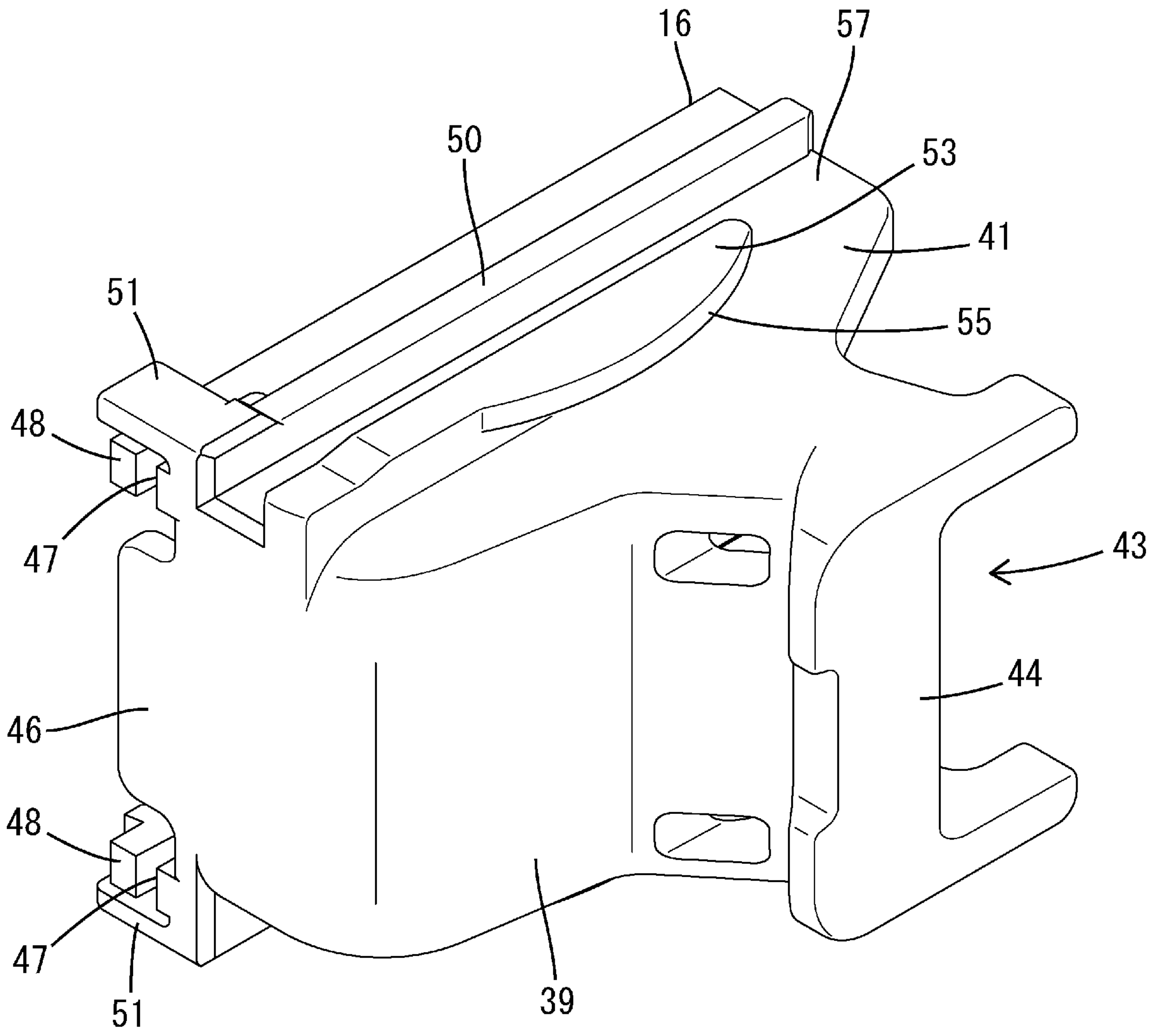
FIG. 6 is a perspective view of the cover in which another opposing surface is arranged at the upper surface side.

The cover 16 is made of synthetic resin and has a cap shape as a whole as shown in FIGS. 5 and 6. As shown in FIG. 2, the cover 16 is attached to the housing 15 and surrounds the plurality of wires 24 extending from the rear surface of the housing 15. The cover 16 includes a back wall 39 arranged to face the rear surface of the housing 15 while being attached to the housing 15, and a pair of opposing walls 40 and 41 protruding forward from the upper and lower ends of the back wall 39. The pair of opposing walls 40 and 41 are arranged so as to face each other in parallel.

The cover 16 has a space inside which the wires 24 are accommodated, and is open at the front and side (diagonal sideways). As shown in FIG. 5, a front opening of the cover 16 is a wire introduction port 42 for introducing the wires 24 into the space. Upper and lower ends of the wire introduction port 42 are partitioned by the front ends of the pair of opposing walls 40 and 41. A side opening of the cover 16 is a wire lead-out port 43 for leading the wires 24 to the outside. The wire lead-out port 43 is partitioned by a lead-out tube 44 at a rear portion of the cover 16.

Figure 18:
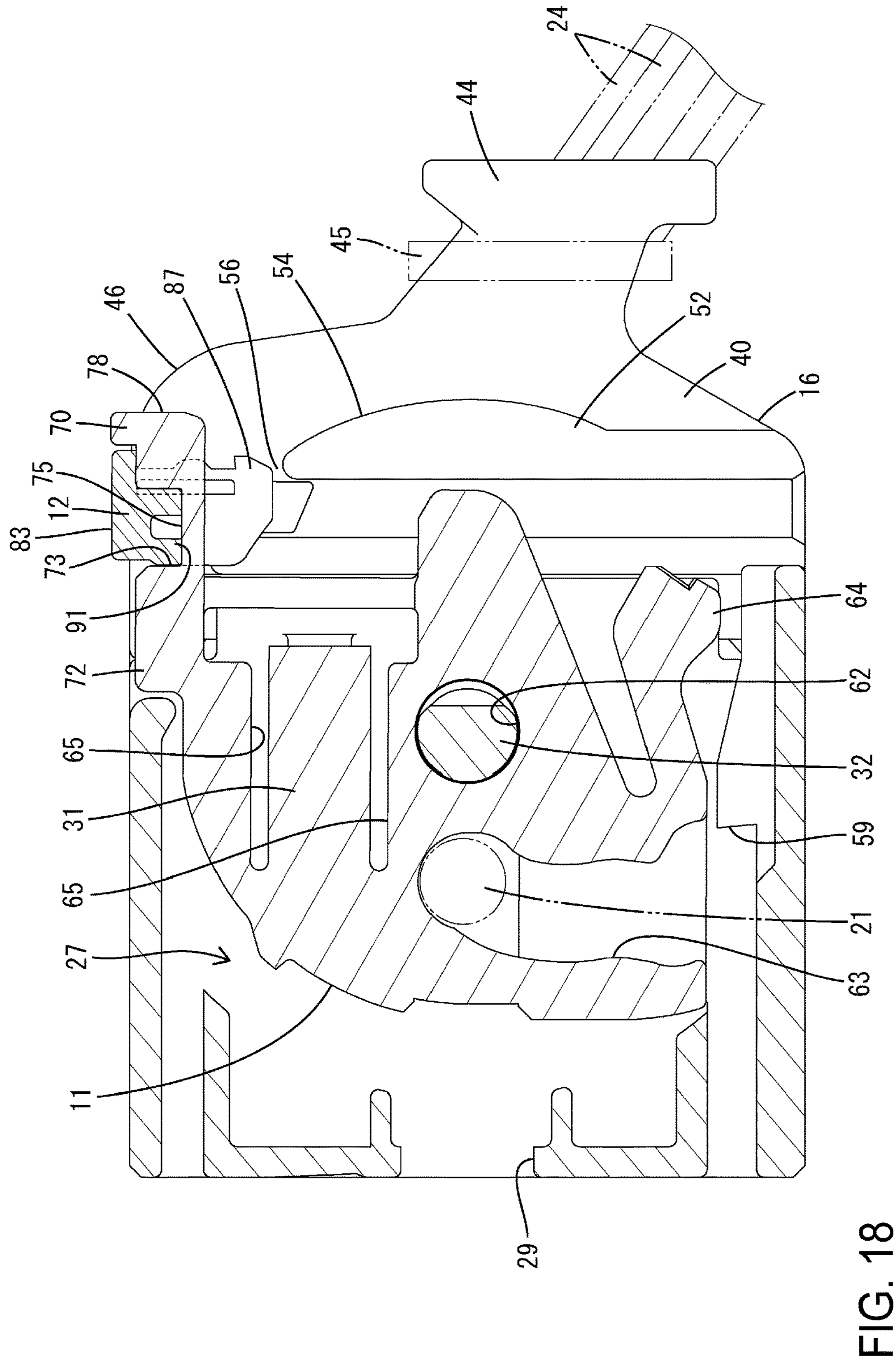
FIG. 18 is a partially broken plan view of the connector having a cover with one opposing surface arranged at the upper surface side.

The lead-out tube 44 has (i) a wall surface portion along the width direction connected to the pair of opposing walls 40 and 41 and (ii) a wall surface portion along the up/down direction connected to the back wall 39, and projects in a direction inclined with respect to the front/rear direction. As shown in FIG. 18, each wire 24 is fastened to the lead-out tube 44 via a fastening means 45 such as a tie band.

As shown in FIG. 6, the cover 16 has a closed portion 46 at one end in the width direction opposite to the wire lead-out port 43. The closed portion 46 is a wall along the up/down direction continuous with the back wall 39. Furthermore, the closed portion 46 is arranged along the front/rear direction. Upper and lower ends of the closed portion 46 are continuous with the pair of opposing walls 40 and 41.

As shown in FIG. 5, the pair of the opposing walls 40 and 41 has upper and lower rail portions 47 along the width direction at the front ends. Two rail portions 47 are formed over the full width at the inner surfaces of the opposing walls 40 and 41. As shown in FIG. 2, the rail portions 47 has an convex/concave cross-sectional shape at the inner surfaces of the opposing walls 40 and 41, and can be engaged with the meshing portion 35 of the housing 15.

As shown in FIG. 5, the two rail portions 47 each have a locking portion 48 at one end in the width direction. The locking portions 48 are cut into the rail portions 47 so as to be bendingly deformable. Each locking portion 48 has a locking projection 49 projecting forward of the opposing walls 40 and 41.

With the two rail portions 47 inserted into the respective rail portions 34 and fitted to the meshing portions 35, the sliding operation of the cover 16 with respect to the housing 15 proceeds. Immediately before the cover 16 is properly mounted on the housing 15, each locking projection 49 rides on an interior surface of the rail portion 34, and the locking portions 48 are bendingly deformed. When the cover 16 is properly attached to the housing 15, the locking portions 48 elastically return, the locking projections 49 fit into the locking receiving portions 36, and the cover 16 is held in a state in which movement is restricted with respect to the housing 15.

Figure 7:
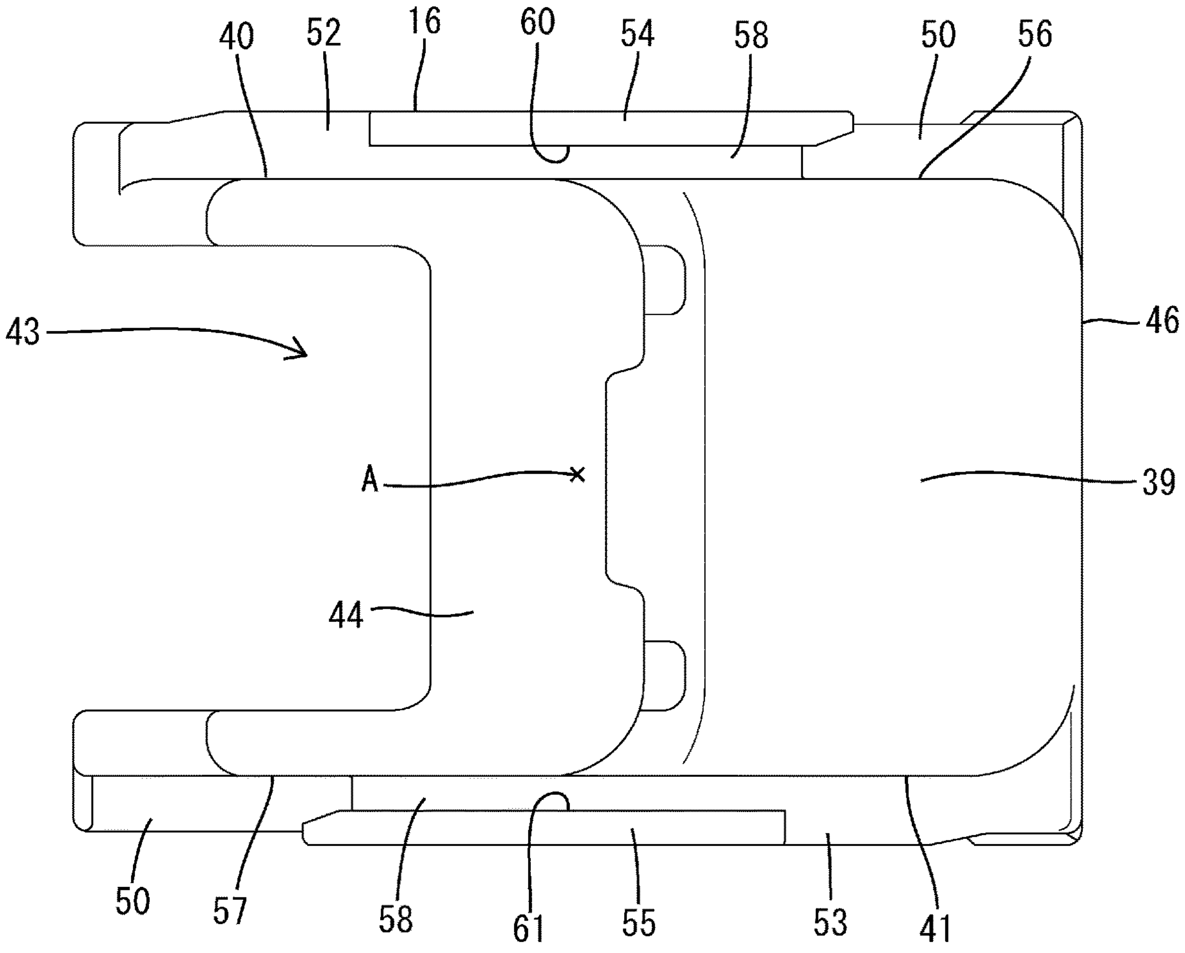
FIG. 7 is a rear view of the cover.
Figure 12:
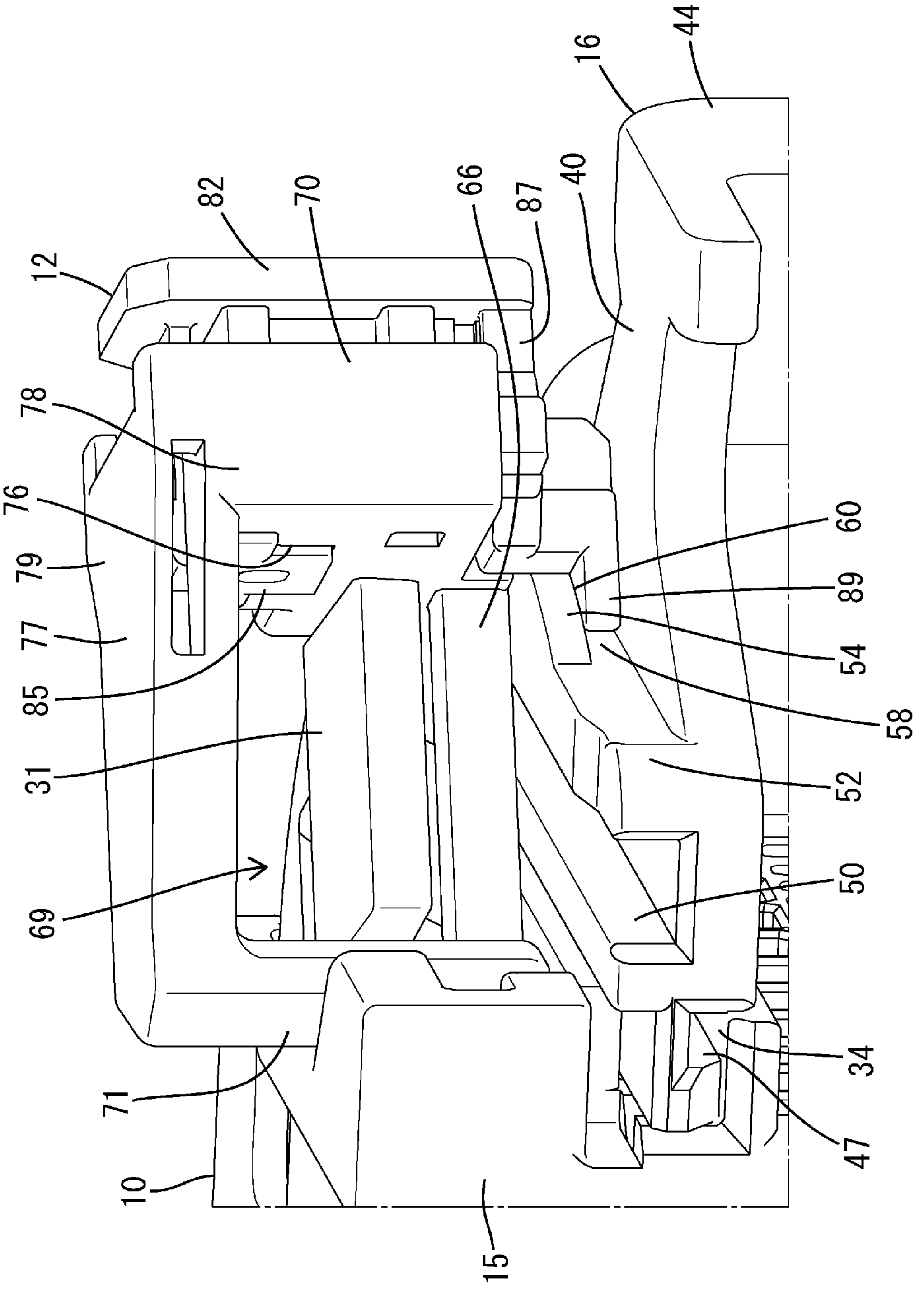
FIG. 12 is a partially enlarged perspective view of the connector in which the lever is in the temporary engagement position and the detection member is at an initial position.
Figure 14:
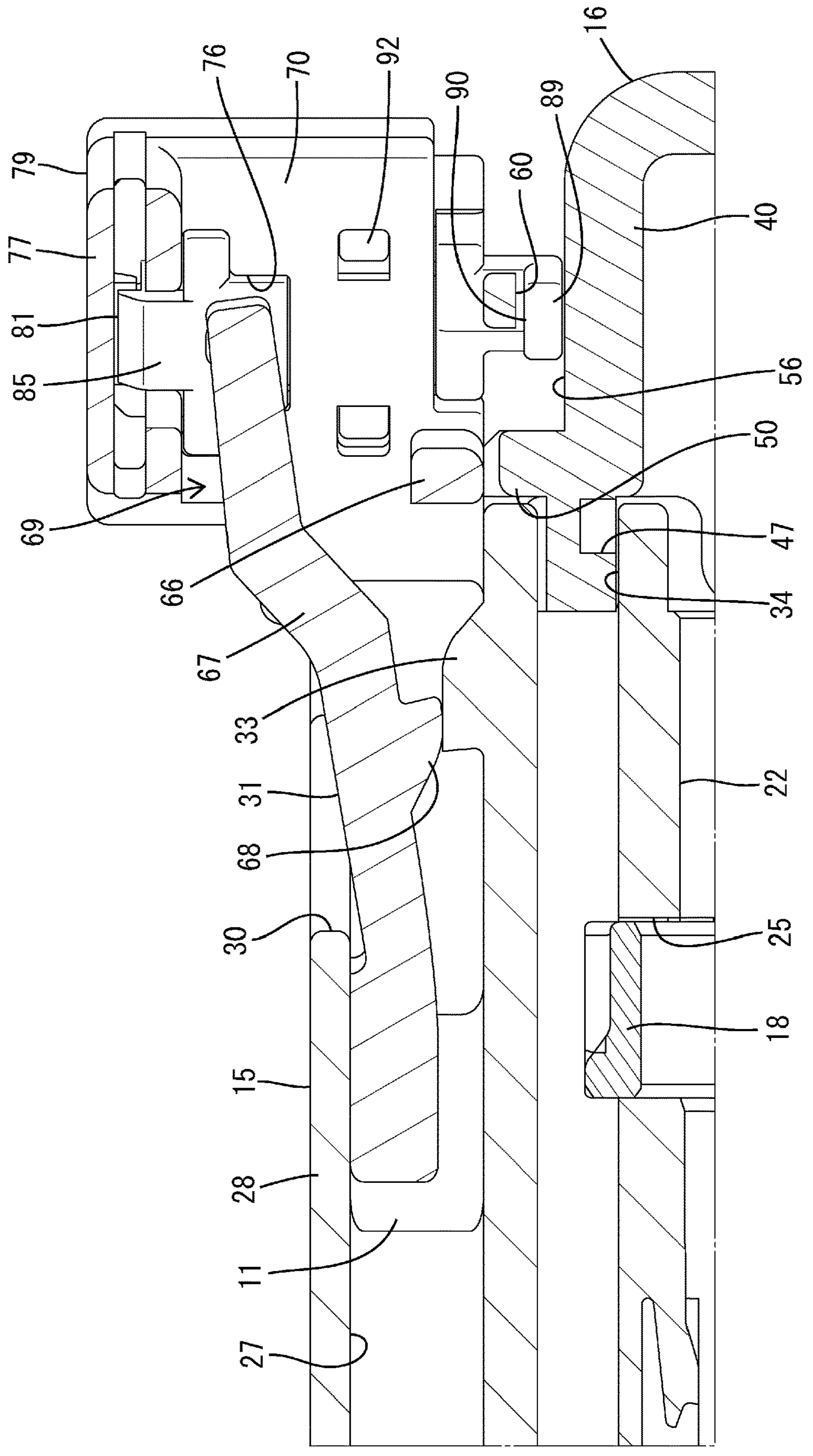
FIG. 14 is a partially enlarged side cross-sectional view of the connector with a lock arm bendingly deformed into a bending space.

As shown in FIGS. 5 and 7, the pair of opposing walls 40 and 41 each have a guide portion 50 extending in the width direction at the outer surface. As shown in FIGS. 12 and 14, when the cover 16 is attached to the housing 15, the guide portions 50 are arranged so as to abutably face the open end portion of the rail portions 34 at the rear surface of the housing 15. Furthermore, as shown in FIG. 5, both the opposing walls 40 and 41 have a stoppered portion 51 at the outer surface. Each stoppered portion 51 has a rectangular plate shape, is continuous with one end of the guide portion 50 in the width direction, and is arranged at one end in the width direction of the opposing walls 40 and 41. When the cover 16 is properly attached to the housing 15, the stoppered portions 51 fit into the corresponding notch portions 37 and abut against the stopper portions 38, so that the sliding operation of the cover 16 is stopped. The stopper portions 38 are arranged outside the tip end side of the locking portions 48.

As shown in FIG. 7, the opposing walls 40 and 41 have ribs 52 and 53 extending in the width direction projecting behind the guide portions 50 at the outer surface. As shown in FIG. 5, of the pair of opposing walls 40 and 41, the rib provided at one opposing wall 40 (hereinafter referred to as a first rib 52) has one end (one end in the extension direction, one end in the width direction) at a distance from the closed portion 46, and the other end (the other end in the extension direction, the other end in the width direction) at a position continuous with the wire lead-out port 43. As shown in FIG. 6, of the pair of opposing walls 40 and 41, the rib provided at the other opposing wall 41 (hereinafter referred to as a second rib 53) has one end at a position continuous with the closed portion 46, and the other end at a distance from the wire lead-out port 43.

Figure 19:
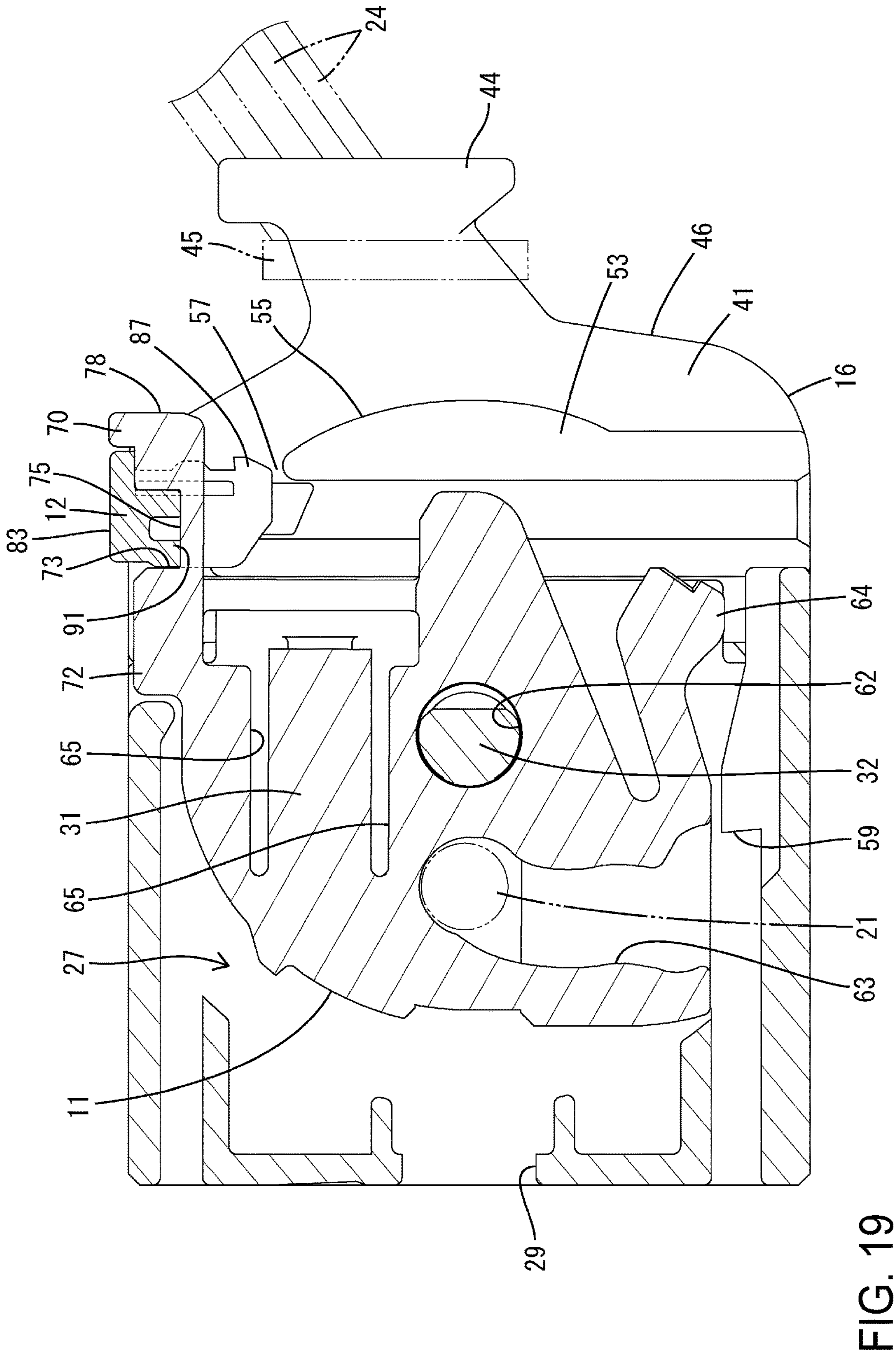
FIG. 19 is a partially broken plan view of the connector having a cover with the other opposing surface arranged at the upper surface side.

Furthermore, the pair of opposing walls 40 and 41 has movement restricting portions 54 and 55 at the outer surface. The movement restricting portions 54 and 55 are formed at rear end edges (rear end faces) of the ribs 52 and 53. The movement restricting portions 54 and 55 restrict the movement of the detection member 12 to a detection position described later. As shown in FIGS. 18 and 19, the movement restricting portions 54 and 55 form an arcuate shape concentric with a rotation direction of the lever 11 centered at the shaft portion 32. Specifically, the movement restricting portions 54 and 55 include a first movement restricting portion 54 formed at one side in the width direction of the rear end edge of the first rib 52, and a second movement restricting portion 55 formed at the other side in the width direction of the rear end edge of the second rib 53.

One end (one end in the extension direction, one end in the width direction) of the first movement restricting portion 54 is set at a position that matches one end of the first rib 52 and is separated from the closed portion 46. As shown in FIG. 5, at the outer surface side of one opposing wall 40, between one end of the first movement restricting portion 54 and the closed portion 46, a movement path (hereinafter referred to as a first movement path 56) for moving the detection member 12 to a detection position described later is formed. The other end of the second movement restricting portion 55 (the other end in the extension direction, the other end in the width direction) matches the other end of the second rib 53 and is installed at a position away from the wire lead-out port 43. As shown in FIG. 6, at the outer surface side of the other opposing wall 41, between the other end of the second movement restricting portion 55 and the wire lead-out port 43, a movement path (hereinafter referred to as a second movement path 57) for moving the detection member 12 to a detection position is formed.

As show in FIG. 7, the first movement restricting portion 54 and the second movement restricting portion 55 have a point-symmetrical shape centered about a position (see symbol A of FIG. 7) that is the center of the cover 16 when the cover 16 is viewed from the rear. That is, when the cover 16 is rotated by 180° about the center of the rear view, the arcuate shapes of the first movement restricting portion 54 and the second movement restricting portion 55 are configured to match and overlap each other. Similarly, the first rib 52 and the second rib 53 also have a point-symmetrical shape centered about the center of the rear view of the cover 16.

Furthermore, as shown in FIG. 7, the cover 16 has recesses 58 that open at the base end portions of the rear end edges of the ribs 52 and 53 (the base end portions of the ribs 52 and 53 in the protruding direction). The movement restricting portions 54 and 55 are provided in an area outside the openings of the recesses 58 at the rear end edges of the ribs 52 and 53.

The cover 16 has pressing portions 60 and 61 at the inner surface of the recesses 58 at the rear end edges of the ribs 52 and 53. The pressing portions 60 and 61 are arranged adjacent to the movement restricting portions 54 and 55 at the inner surface of the recesses 58 and facing the outer wall surfaces of the main body portions of the opposing walls 40 and 41. As shown in FIG. 3, the pressing portions 60 and 61 include (i) a first pressing portion 60 orthogonal to the first movement restricting portion 54 at the outer surface side of one opposing wall 40 and (ii) a second pressing portion 61 orthogonal to the second movement restricting portion 55 at the outer side of the other opposing wall 41.

<Lever>

Figure 8:
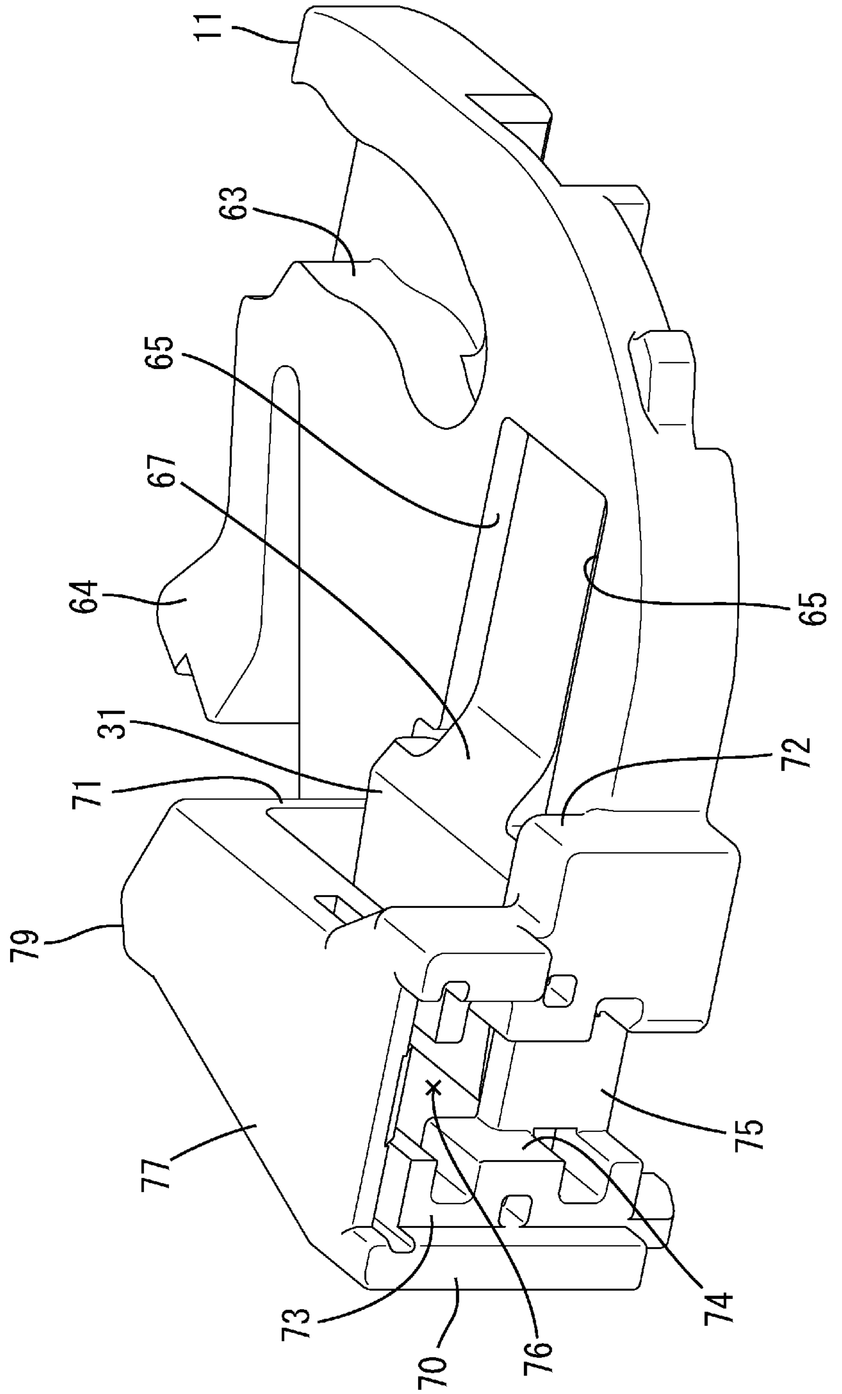
FIG. 8 is a perspective view of the lever.

The lever 11 is made of synthetic resin and has a single flat plate shape as a whole, as shown in FIG. 8. As shown in FIG. 18, the lever 11 includes a bearing portion 62, which is a circular hole with a bottom, and a cam groove 63 extending from the vicinity of the bearing portion 62 to the outer edge.

The lever 11 is housed in the lever housing chamber 27 of the housing 15 with the plate surfaces running along the width direction. Then the lever 11 is rotatingly displaced, with respect to the connector body 10, to a temporary locking position (see FIGS. 2, 12, and 13) and a permanent locking position (see FIGS. 1 and 3, and FIGS. 15-19), centered at the shaft portion 32 fitted to the bearing portion 62. The lever 11 is arranged at the temporary locking position with the entrance of the cam groove 63 facing forward. The entrance of the cam groove 63 communicates with the cam follower insertion groove 29, and the cam follower 21 is caused to enter inward at the start of fitting between the connector body 10 and the counterpart housing 14.

In the process of rotating the lever 11 toward the permanent locking position, the cam follower 21 slides in the groove surface of the cam groove 63, and the fitting of the connector body 10 and the counterpart housing 14 proceeds. When the lever 11 reaches the permanent locking position, the entrance of the cam groove 63 is arranged so as to face the other side in the width direction, and the cam follower 21 is arranged at the interior end side of the cam groove 63. As a result, the connector body 10 and the counterpart housing 14 are in a state of being properly fitted. In the following configuration description of the lever 11, the front/rear direction, the up/down direction, and the width direction are based on the front/rear direction, the up/down direction, and the width direction in a state in which the lever 11 is at the permanent locking position.

As shown in FIG. 8, the lever 11 has a temporary locking piece 64 extending rearward in a cantilever shape at the outer peripheral edge at the other end side in the width direction. The temporary locking piece 64 locks a temporary locking receiving portion 59 (see FIG. 18) in the lever housing chamber 27, so that the lever 11 is restricted from moving from the temporary locking position to the permanent locking position.

As shown in FIG. 8, the lever 11 has the lock arm 31 extending rearward from the vicinity of the interior end of the cam groove 63 in a cantilever shape at one end side in the width direction. The lock arm 31 is formed in the lever 11 in a plate shape between notch portions 65 paired in the width direction. The lock arm 31 can be bendingly deformed in the up/down direction with the position near the front end of the lever 11 as a fulcrum.

Figure 15:
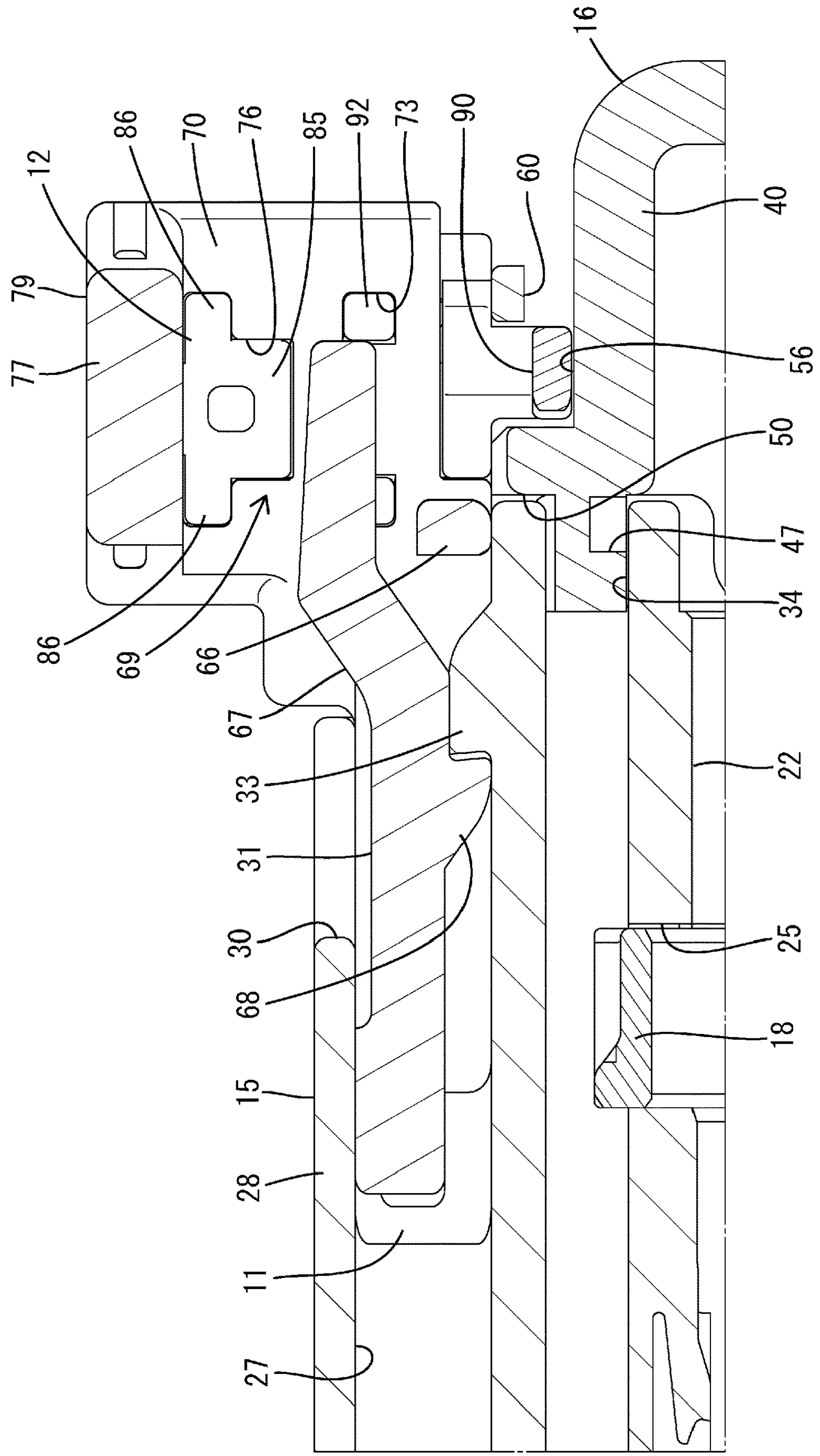
FIG. 15 is a partially enlarged side cross-sectional view of the connector in which the lock arm engages a locking portion and the detection member is allowed to move to a detection position.

The lock arm 31 has a rear end portion at a position one step higher than the front portion. As shown in FIG. 15, an inclined portion 67 inclined with respect to the front/rear direction is provided between the rear end portion and the front portion of the lock arm 31. The lever 11 has a bridging portion 66 (see FIG. 12) in a form of being bridged between the notch portions 65 below the rear end portion of the lock arm 31. When the rear end portion of the lock arm 31 abuts against the bridging portion 66, the downward bending movement of the lock arm 31 is restricted.

As shown in FIGS. 14 and 15, the lock arm 31 has a claw-shaped lock protrusion 68 at a position close to the inclined portion 67 at the lower surface of the front portion. The lock protrusion 68 can be locked to the lock portion 33 of the housing 15. By locking the lock protrusion 68 to the lock portion 33, the lever 11 is held at the permanent locking position with respect to the housing 15. As a result, the connector body 10 and the counterpart housing 14 are held in the fitted state.

As shown in FIG. 8, the lever 11 has a shape that is raised at the opening edge of two notch portions 65, and has protective walls 70 and 71 facing each other with a gap from two side surfaces (end surfaces at two sides in the width direction) of the rear end portion of the lock arm 31. Of these, the front/rear length (the front/rear length including a mounting portion 73 (mount) described later) of the protective wall (hereinafter referred to as a first protective wall 70) at one side in the width direction is made larger than the front/rear length of the protective wall (hereinafter referred to as a second protective wall 71) at the other side in the width direction.

The first protective wall 70 is positioned at one end in the width direction of the lever 11 and has a portion protruding laterally. The first protective wall 70 has a square block-shaped abutment stop portion 72 that projects forward. As shown in FIGS. 1 and 18, when the lever 11 reaches the permanent locking position, the abutment stop portion 72 abuttably faces the edge portion continuous with the arm release portion 30 at the rear end edge of the upper wall portion 28, and the rotation operation of the lever 11 is stopped. As shown in FIG. 12, the rear end surface of the first protective wall 70 has a flat shape along the width direction and the height direction, and is formed wider than the rear end surface of the second protective wall 71.

As shown in FIG. 8, the first protective wall 70 has the mounting portion 73. The detection member 12 is mounted on the mounting portion 73. The mounting portion 73 includes (i) a concave portion 74 recessed at the outer surface of the first protective wall 70, (ii) a wall surface portion 75 that closes the lower portion of the interior surface of the concave portion 74, and (iii) an opening 76 that opens in the upper portion of the interior surface of the concave portion 74. The mounting portion 73 is in a form of going through the first protective wall 70 in the width direction (wall thickness direction) via the opening 76 at the upper portion. The concave portion 74 has a groove portion that that goes through in the width direction and communicates with the opening 76 at the up/down position of the front and rear inner wall surfaces.

The lever 11 has a top wall 77 along the width direction connecting the upper end of the first protective wall 70 and the upper end of the second protective wall 71. The front/rear dimension of the top wall 77 gradually decreases from the first protective wall 70 side to the second protective wall 71 side. The rear end surface of the top wall 77 is arranged so as to be inclined with respect to the width direction in a plan view. As shown in FIG. 12, each rear end surface of the top wall 77 and the first protective wall 70 is a flat lever pressing surface 78, and is pressed when the lever 11 is moved toward the permanent locking position.

Also, the lever 11 is configured to have a frame portion 79 (frame) having a gate-shaped frame shape by the first protective wall 70, the second protective wall 71, and the top wall 77 between the edges of the notch portions 65 at the rear end portion at one end side in the width direction.

Figure 13:
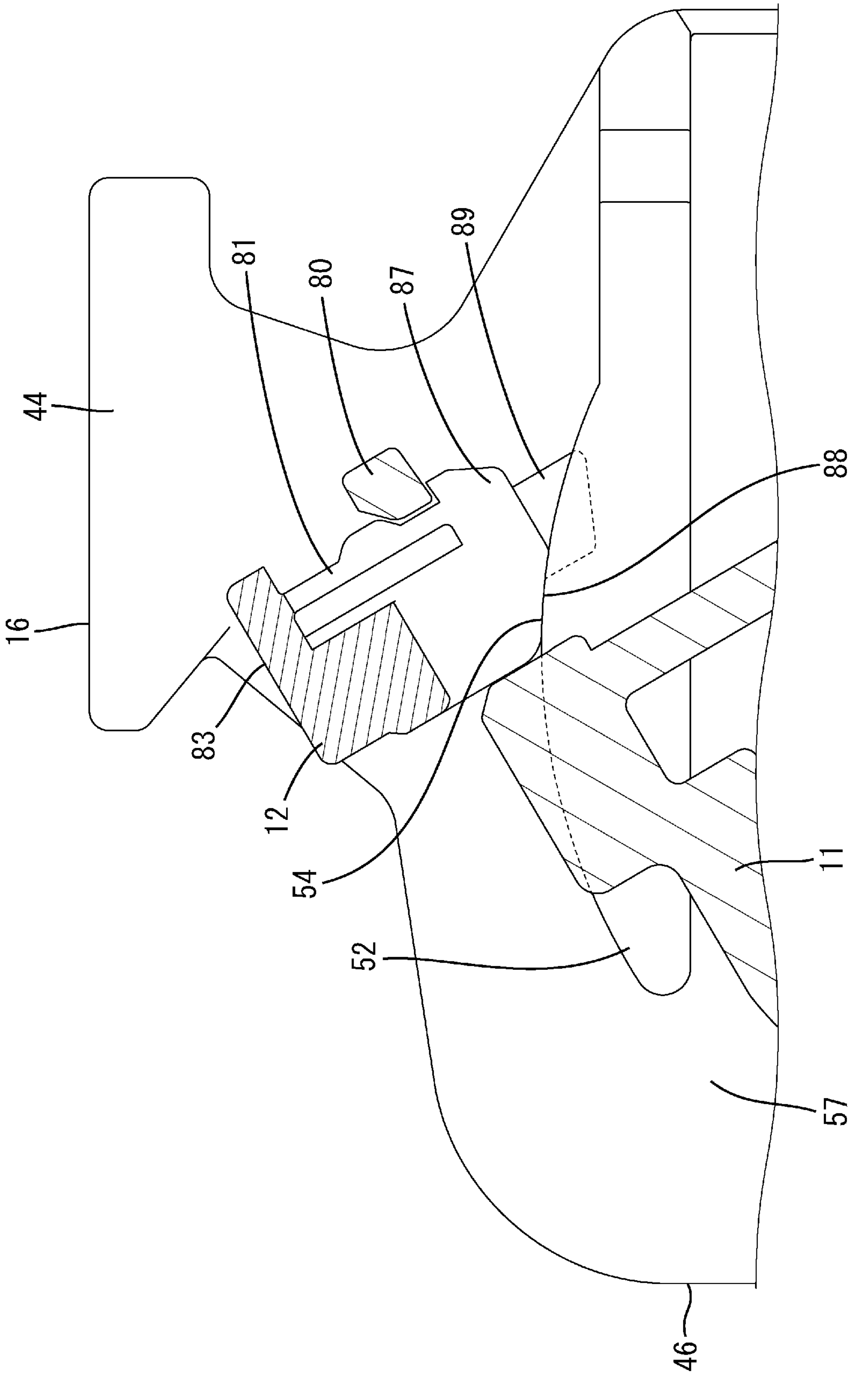
FIG. 13 is a partially enlarged planar cross-sectional view of the connector in the state shown in FIG. 12.
Figure 16:
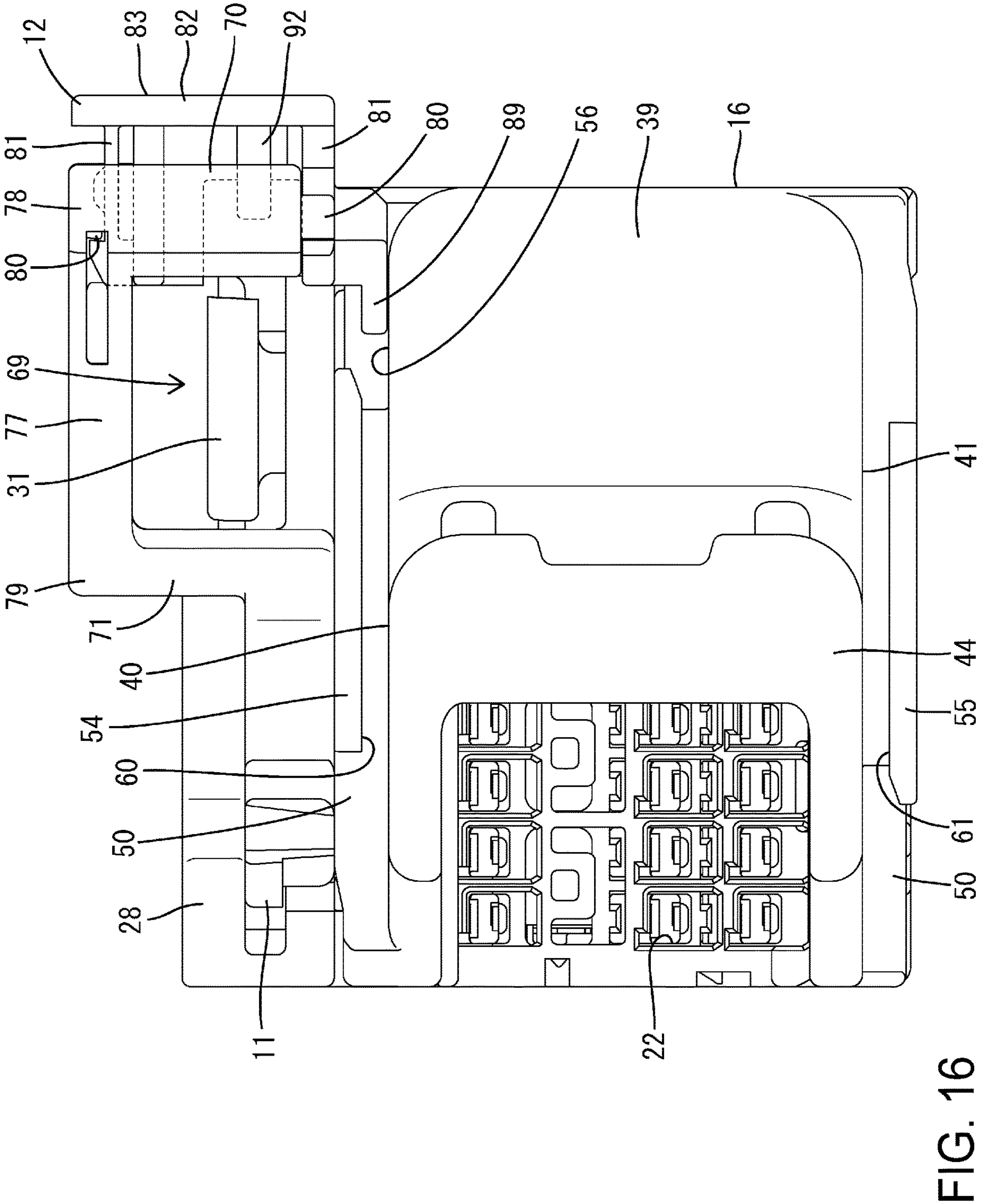
FIG. 16 is a rear view of the connector in which the lever is in the permanent locking position and the detection member is at the initial position.
Figure 17:
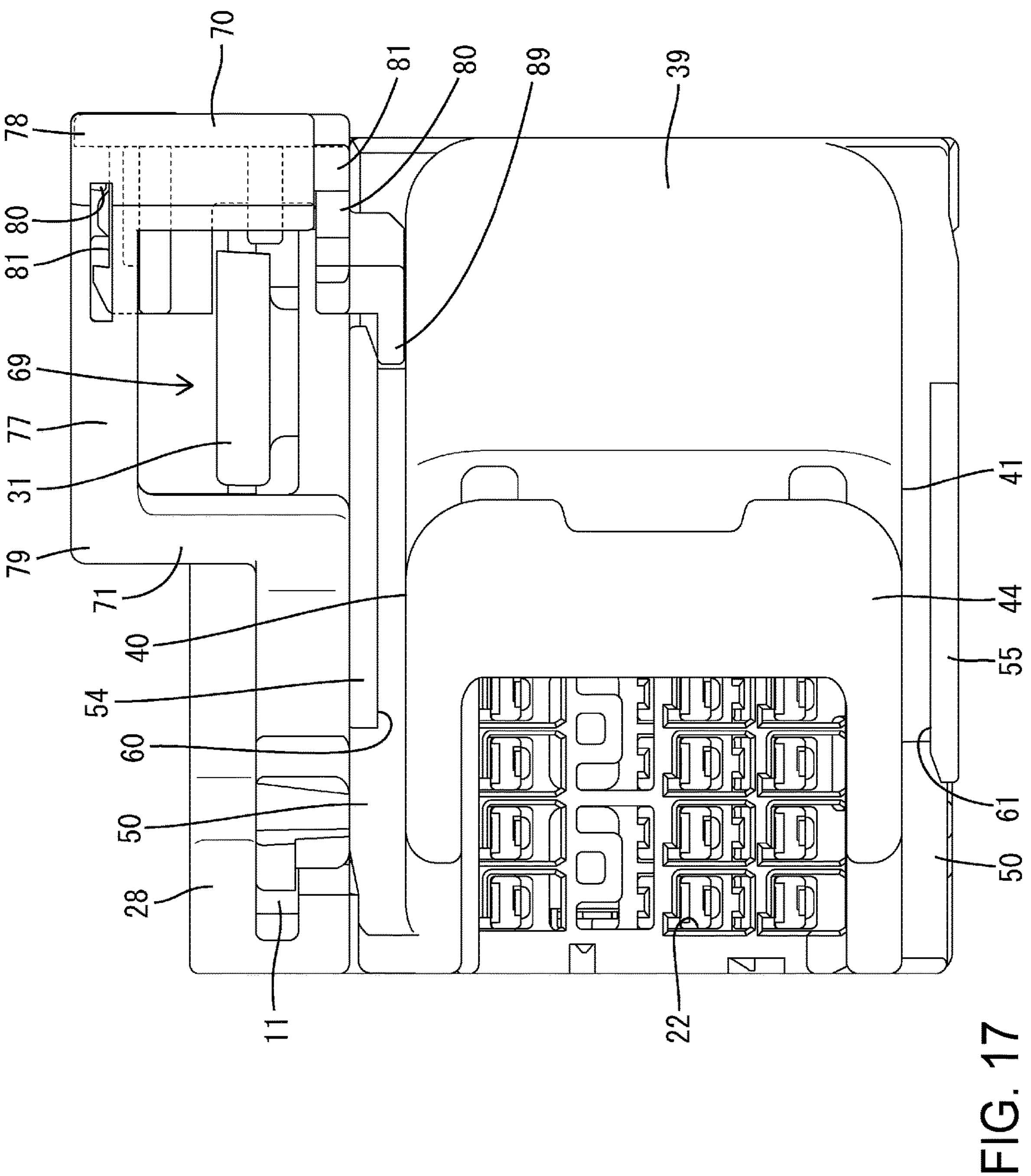
FIG. 17 is a rear view of the connector in which the lever is in the permanent locking position and the detection member is in the permanent locking position.

Additionally, the lever 11 has locked portions 80 at the inside of the top wall 77 and at the lower surface of the first protective wall 70, respectively (see FIGS. 13, 16 and 17). Each locked portion 80 can be locked to a respective one of the elastic locking portions 81 described later of the detection member 12.

<Detection Member>

The detection member 12 is made of synthetic resin and, in a state of being held by the mounting portion 73 of the first protective wall 70, is movable with respect to the lever 11 to a standby position (see FIGS. 2, 12, and 16) and a detection position (see FIGS. 1, 17-19). A standby position is a position in which the detection member 12 is held with respect to the lever 11 before the housing 15 and the counterpart housing 14 are properly fitted. The detection position is a position in which the detection member 12 has moved with respect to the lever 11 (lock arm 31) when the housing 15 and the counterpart housing 14 are properly fitted. Further, the detection direction described later is a direction in which the detection member 12 moves with respect to the lever 11 (lock arm 31) when the housing 15 and the counterpart housing 14 are properly fitted. In the following configuration description of the detection member 12, the front/rear direction, the up/down direction, and the width direction are based on the front/rear direction, the up/down direction, and the width direction of the detection member 12 held by the mounting portion 73 of the first protective wall 70 when the lever 11 is at the permanent locking position.

Figure 9:
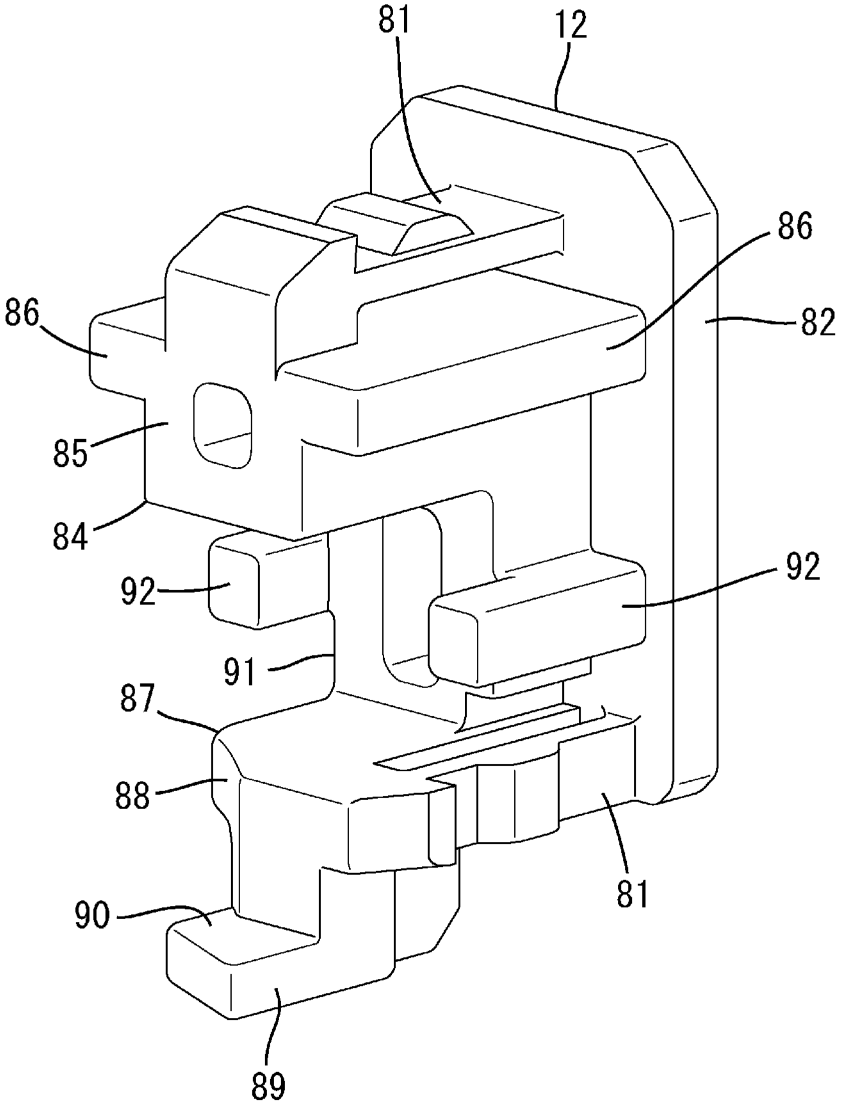
FIG. 9 is a perspective view of a detection member.
Figure 10:
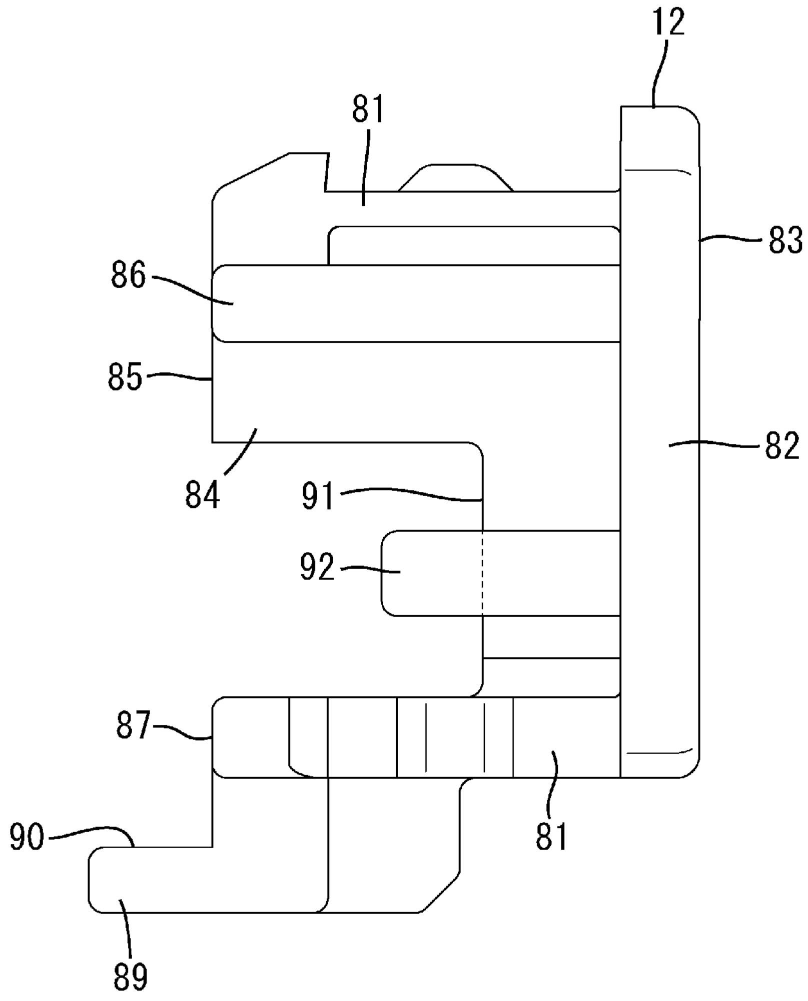
FIG. 10 is a rear view of the detection member.
Figure 11:
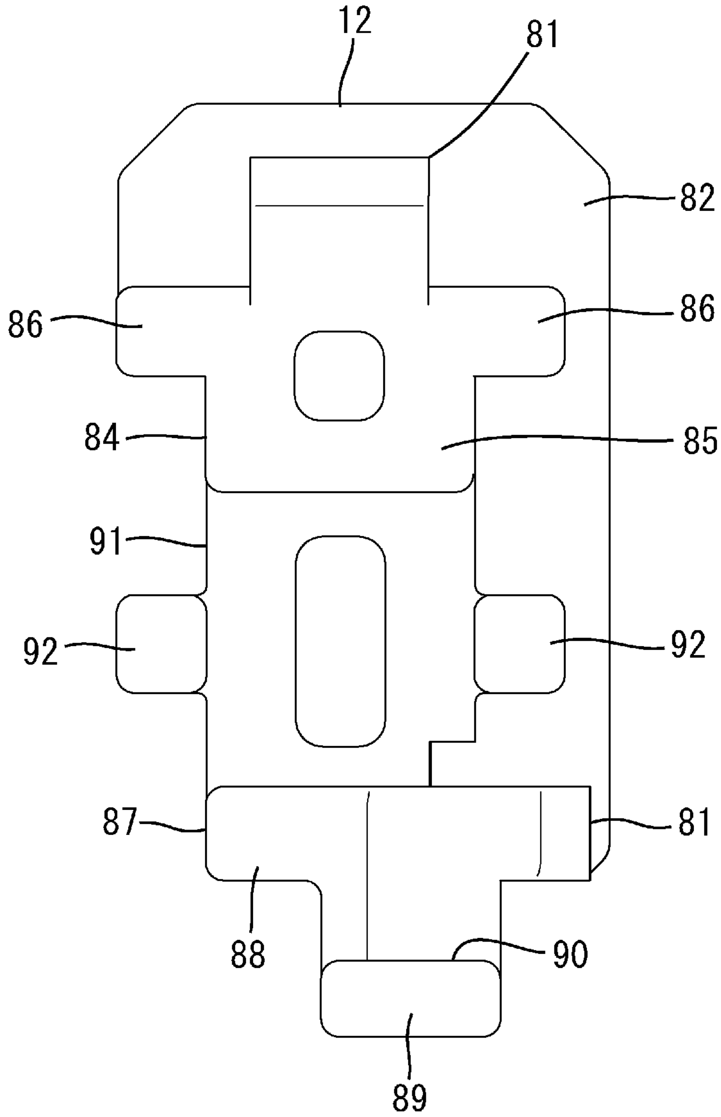
FIG. 11 is a side view of the detection member.

As shown in FIGS. 9-11, the detection member 12 has a flat plate-shaped base portion 82 at one end in the width direction. As shown in FIG. 1, the end surface of the base portion 82 at one side in the width direction is a flat detection member pressing surface 83 along the front/rear direction and the up/down direction. As shown in FIG. 9, the detection member 12 has a detection piece 84 projecting from the upper portion of the base portion 82 to the other side in the width direction. The other end surface of the detection piece 84 in the width direction is a flat restriction surface 85 along the up/down direction and the front/rear direction.

The detection piece 84 has rib-shaped portions 86 to the front and back from a prismatic main body portion, and which extend in the width direction. As shown in FIG. 15, the rib-shaped portions 86 fit into the groove portions of the opening 76. Further, as shown in FIGS. 9 and 10, the detection piece 84 has the upper elastic locking portion 81 bridged between the tip end portion of the upper surface of the detection piece 84 and the front surface of the base portion 82. Each of the elastic locking portions 81 has a double-sided beam shape, and can be bendingly deformed in the up/down direction with (i) the front end continuous with the above-mentioned prismatic main body portion and (ii) the rear end continuous with the base portion 82 as fulcrums. Each of the elastic locking portions 81 has protrusions protruding upward at the other end in the width direction and the intermediate portion in the width direction, respectively.

The detection member 12 has an engaging piece 87 projecting from the lower portion of the base portion 82 to the other side in the width direction. As shown in FIG. 9, the engaging piece 87 has a slit portion along the width direction at the rear end portion of the plate-shaped main body portion, and has the lower elastic locking portion 81 outside the slit portion. Each of the elastic locking portions 81 has a double-sided beam shape, and the slit portion can be bendingly deformed in a direction narrowing the front/rear width (front/rear direction). The elastic locking portions 81 have protrusions protruding rearward at the other end in the width direction and the middle portion in the width direction, respectively. As shown in FIG. 16, the upper and lower elastic locking portions 81 are elastically locked to the upper and lower locked portions 80, so that the detection member 12 is held in a state in which it is retained with respect to the lever 11 at the temporary locking position.

As shown in FIG. 9, the engaging piece 87 has a slope-shaped movement restricted portion 88 having chamfered front corner portions on the other end surface (the surface at the detection position side), in the width direction, of the above-described plate-shaped main body portion. As shown in FIG. 13, the movement restricted portion 88 of the engaging piece 87 may slide and abut against the movement restricting portions 54 and 55 in the rotation process of the lever 11.

As shown in FIGS. 9 and 10, the engaging piece 87 has a bent portion that briefly protrudes downward from the tip end portion of the above-mentioned plate-shaped main body portion and then protrudes to the other side in the width direction, and has a pressed portion 90 at the upper surface (a surface facing the side opposite to the side that faces the outer surface of the connector body 10 (the outer surfaces of the pair of opposing walls 40 and 41 of the cover 16)) of a protruding portion 89 in the bent portion toward the other side in the width direction. As shown in FIG. 12, the protruding portion 89 of the engaging piece 87 can be fitted in the recess 58. As shown in FIGS. 12 and 14, the pressed portion 90 of the protruding portion 89 abuttably faces the pressing portions 60 and 61. When the pressed portion 90 abuts against the pressing portions 60 and 61, the detection member 12 is suppressed from being displaced in the direction away from the outer surface of the opposing walls 40 and 41.

As shown in FIGS. 9 to 11, the detection member 12 has a connecting portion 91 at an intermediate portion in the up/down direction between the detection piece 84 and the engagement piece 87. The respective base end portions of the detection piece 84 and the engagement piece 87 are connected via the connecting portion 91. The other end surface in the width direction and the front/rear end surfaces of the connecting portion 91 are formed flat along the up/down direction. Further, the detection member 12 has guide ribs 92 extending from the base portion 82 to the other side in the width direction while being connected to the front/rear end surfaces of the connecting portion 91. The tip end portions of the guide ribs 92 protrude from the other end surface of the connecting portion 91 in the width direction to the other side in the width direction. As shown in FIG. 15, the tip end portions of the guide ribs 92 fit into the groove portions at the lower side of the mounting portion 73.

<Connector Assembly Configuration and Fitting Configuration>

At the time of assembly, the detection member 12 is inserted from the side into the mounting portion 73 of the first protective wall 70, which is positioned at one side in the width direction, which is one side of the lock arm 31. As shown in FIGS. 13 and 16, each locked portion 80 is elastically fitted between the protrusions of a respective one of the elastic locking portions 81, so that the detection member 12 is held at the temporary locking position with respect to the lever 11.

When the detection member 12 is at the standby position, the tip end portion (the other end portion in the width direction) of the detection piece 84 enters and is arranged in the opening 76. As shown in FIG. 12, the restriction surface 85 of the detection piece 84 is exposed at the inner surface of the first protective wall 70 at the standby position and faces a bending space 69 of the lock arm 31, but is not arranged at a position in which it interferes with the lock arm 31. Further, when the detection member 12 is at the standby position, the rib-shaped portions 86 and the guide ribs 92 are fitted into each groove portion of the mounting portion 73, and the tip end portion of the engaging piece 87 is arranged along the lower surface (lower surface of the lever 11) of the first protective wall 70. The base portion 82 is arranged at the standby position away from the first protective wall 70 at one side in the width direction.

The lever 11 is inserted into the lever housing chamber 27 of the housing 15 from the rear. After the bending deformation of the upper wall portion 28, the shaft portion 32 of the housing 15 is fitted into the bearing portion 62 of the lever 11. Then, the lever 11 is held at the temporary locking position with respect to the housing 15 by locking the temporary locking piece 64 and the temporary locking receiving portion 59. As shown in FIG. 2, the lever 11 projects largely to the rear of the housing 15 at the temporary locking position, and positions the frame portion 79 and the lock arm 31 behind the housing 15.

Furthermore, the cover 16 is attached to the housing 15. For example, when it is desired to lead the wires 24 to the rear and to the other side in the width direction as shown in FIG. 18, the cover 16 is slid from one side in the width direction to the other side while the rail portions 47 run along the rail portions 34. The stoppered portions 51 abut against the stopper portions 38 in the notch portion 37, and the locking portions 48 are elastically locked to the locking receiving portions 36, so that the cover 16 is held in a movement restricted state at a proper mounting position with respect to the housing 15. As shown in FIG. 2, when the rail portions 47 mesh with the meshing portions 35, the cover 16 is restricted from being detached from the housing 15.

As described above, when the cover 16 is properly attached to the housing 15, the closed portion 46 is arranged at one end side in the width direction, and the wire lead-out port 43 is arranged at the other end side in the width direction. Furthermore, the lever 11 is arranged along the upper surface of one opposing wall 40, and the first movement path 56 is arranged at one end side in the width direction.

When the lever 11 is at the temporary locking position and the detection member 12 is at the standby position, the movement restricted portion 88 of the engaging piece 87 is arranged facing the first movement restricting portion 54 so as to be abuttable from the rear, as shown in FIG. 2. The protruding portion 89 of the engaging piece 87 is fitted in the recess 58 of the first rib 52, and the pressed portion 90 of the protruding portion 89 is arranged facing the first pressing portion 60 so as to be abuttable from the inside. Thus, the detection member 12 is arranged close to one side of the lead-out tube 44.

Subsequently, the connector body 10 is fitted to the counterpart housing 14. With the connector body 10 shallowly fitted in the hood portion 19 of the counterpart housing 14, and the cam follower 21 entering the entrance of the cam groove 63, the temporary locking piece 64 and the temporary locking receiving portion 59 are released from each other by the counterpart housing 14. When an operator presses the lever pressing surface 78 to one side in the width direction, the lever 11 is rotationally displaced toward the permanent locking position side. In the rotation process of the lever 11, the movement restricted portion 88 of the engaging piece 87 abuts against the first movement restricting portion 54 and slides, so that the detection member 12 is restricted from moving to the detection position side. Further, when the pressed portion 90 of the protruding portion 89 abuts against the first pressing portion 60, it is possible to suppress the detection member 12 from floating from the outer surface of one opposing wall 40.

Immediately before the lever 11 reaches the permanent locking position, the movement restricted portion 88 of the engaging piece 87 disengages from the first movement restricting portion 54 and faces the first movement path 56. Further, immediately before the lever 11 reaches the permanent locking position, as shown in FIG. 14, the lock protrusion 68 interferes with the lock portion 33, and the lock arm 31 is bendingly deformed into the upper bending space 69. At this stage, even if the detection member 12 is to be moved to the other side in the width direction toward the detection position, the detection member 12 does not reach the detection position because the restriction surface 85 of the detection piece 84 abuts against one side surface of the lock arm 31.

When the lever 11 reaches the permanent locking position, the lock arm 31 elastically returns. As shown in FIG. 15, the lock projection 68 faces the lock portion 33 from the front and is arranged so as to be able to be locked. As a result, the rotational displacement of the lever 11 to the rear is restricted. Then, as shown in FIG. 1, when the abutment stop portion 72 abuts against the rear end edge of the upper wall portion 28, the forward rotational displacement of the lever 11 is also restricted. Further, the rear portion of the lock arm 31 is arranged in the arm release portion 30 of the upper wall portion 28.

When the lock arm 31 elastically returns, the detection piece 84 is in a state in which it can enter the bending space 69. As described above, the movement restricted portion 88 of the engaging piece 87 is already arranged so as to be able to enter the first movement path 56. Therefore, when an operator presses the detection member pressing surface 83 to the other side in the width direction, the protruding portion of each elastic locking portion 81 rides on a respective locked portion 80, and the detection member 12 can move toward the detection position. In the process of moving the detection member 12 to the detection position, the rib-shaped portion 86 and the guide rib 92 slide in each groove portion of the mounting portion 73, and the movement operation of the detection member 12 is guided.

When the detection member 12 reaches the detection position, as shown in FIG. 17, the protruding portions of the elastic locking portions 81 are arranged facing the respective locked portions 80 so as to be abuttable from the other side in the width direction. As a result, the detection member 12 is restricted from moving in the direction of returning to the initial position. Further, as shown in FIG. 18, the other end surface of the connecting portion 91 in the width direction abuttably faces the wall surface portion 75 the wall surface portion 75, so that the detection member 12 is restricted from moving to the other side in the width direction from the detection position.

When the detection member 12 reaches the detection position, the detection piece 84 is arranged in the bending space 69 as shown in FIG. 17. As a result, the upward bending movement of the lock arm 31 is restricted by the detection piece 84, and a state is maintained in which the lock arm 31 and the lock portion 33 are locked. Further, as shown in FIG. 18, the engaging piece 87 enters the first movement path 56 and is released. The base portion 82 is fitted to the concave portion 74, and the entire base portion 82 is housed in the mounting portion 73. Therefore, the detection member 12 does not have a portion protruding from the first protective wall 70 at the detection position.

Meanwhile, opposite to the above-mentioned state (the state in which the wires 24 are led out rearward and toward the other side in the width direction), when the wires 24 are to be led out rearward and toward one side in the width direction as shown in FIG. 19, the cover 16 is inverted from the above-mentioned posture, and the rail portions 47 are slid from the other side in the width direction toward one side while the rail portions 47 run along the rail portions 34.

When the cover 16 is properly attached to the housing 15, as shown in FIG. 19, the closed portion 46 is arranged at the other end side in the width direction, and the wire lead-out port 43 is arranged at one end side in the width direction. Further, the lever 11 is arranged along the upper surface of the other opposing wall 41, and the second movement path 57 is arranged at one end side in the width direction. The form (shape, arrangement) of the second movement restricting portion 55 and the second pressing portion 61 at the upper surface side of the cover 16 is the same as in the above-described embodiment. Therefore, in the same manner as the above-mentioned embodiment, the rotation operation of the lever 11 and the movement operation of the detection member 12 can be performed.

As explained above, the connector of this embodiment can achieve the following effects.

The detection member 12 is arranged at a position facing, and closely against, one side surface among two side surfaces of the lock arm 31. Both side surfaces of the lock arm 31 are surfaces facing two sides in the width direction orthogonal to (i) the front/rear direction which is the length direction of the lock arm 31 and (ii) the up/down direction which is the bending direction of the lock arm 31. Thus, due to the presence of the detection member 12, it is possible to suppress the connector from becoming larger in the front/rear direction and the up/down direction.

The detection member 12 is in a state of being movable from one side surface side to the other side surface side with respect to the lock arm 31 when the connector body 10 and the counterpart housing 14 are properly fitted. Therefore, the detection member 12 can be pushed to the other side in the width direction to easily reach the detection position.

The detection member 12 is movably held by the mounting portion 73 provided at the first protective wall 70 facing one side surface of the lock arm 31. Since the first protective wall 70 has both a protective function for protecting the lock arm 31 from one side in the width direction and a holding function for holding the detection member 12, the connector configuration may be simplified as compared with the case in which both functions are provided separately.

The lock arm 31 is provided at the lever 11. The detection member 12 is held by the lever 11. Therefore, the lock arm 31 can be omitted from the housing 15, and the housing 15 does not need to be provided with the holding configuration of the detection member 12. Therefore, the configuration of the housing 15 may be simplified.

The lever 11 has, on the frame portion 79, the lever pressing surface 78 exposed at the rear in the fitting direction, which is pressed when the lever 11 is rotated to the permanent locking position. The detection member 12 has, at the base portion 82, a detection member pressing surface 83 exposed at the rear of the detection direction, which is pressed when the detection member 12 is moved to the detection position. When the lever 11 is at the permanent locking position, as shown in FIGS. 18 and 19, the lever pressing surface 78 is arranged facing rearward, and the detection member pressing surface 83 is arranged facing one side in the width direction. That is, the lever pressing surface 78 and the detection member pressing surface 83 are arranged so as to face different directions from each other. Therefore, when the lever 11 is rotated toward the permanent locking position, the lever pressing surface 78 can be pressed without contacting the detection member pressing surface 83. Further, when the detection member 12 is moved toward the detection position, the detection member pressing surface 83 can be pressed without contacting the lever pressing surface 78. Therefore, the rotation operation of the lever 11 and the movement operation of the detection member 12 can be smoothly performed without interfering with each other.

Further, in the case of this embodiment, the detection member 12 abuts against the movement restricting portions 54 and 55 before the proper fitting of the connector body 10 and the counterpart housing 14, and is restricted from moving to the detection position with respect to the lever 11.

Conventionally, in the case of a connector having a cantilever lever having one rotation center axis, it is sufficient that the movement restricting portion is provided only at the opposing wall, on the side at which the lever is arranged, out of the opposing walls of the cover.

In contrast, in the case of this embodiment, the movement restricting portions 54 and 55 are provided at each of the pair of opposing walls 40 and 41. Further, the movement restricting portions 54 and 55 have a point-symmetrical shape centered at the center of the rear view of the cover 16 (see symbol A of FIG. 7). Therefore, the cover 16 can be used reversibly (in either the right-left direction). As a result, the lead-out direction of the wires 24 may be easily changed merely by rotating the cover 16 by 180° (see FIGS. 18 and 19).

Of the pair of opposing walls 40 and 41, one opposing wall 40 has the first movement path 56 between one end in the width direction of the first movement restricting portion 54 and the closed portion 46, and the other opposing wall 41 has the second movement path 57 between the other end of the second movement restricting portion 55 in the width direction and the wire lead-out port 43. Therefore, by using the shapes of the first movement path 56, the closed portion 46, the second movement path 57, and the wire lead-out port 43 as a reference, the mounting posture of the cover 16 can be confirmed, and it is possible to suppress the cover 16 from being accidentally attached to the housing 15.

Additionally, in the case of this embodiment, the connector body 10 has the movement restricting portions 54 and 55 and the pressing portions 60 and 61 at the outer surface side. The movement restricting portions 54 and 55 can abut against the detection member 12 from the detection position side. The pressing portions 60 and 61 can abut against the detection member 12 from an outside position. Since the connector body 10 has the pressing portions 60 and 61 in addition to the movement restricting portions 54 and 55, it is possible to suppress the detection member 12 from being displaced in a direction away from the outer surface side of the opposing walls 40 and 41. As a result, the state in which the detection member 12 abuts against the movement restricting portions 54 and 55 can be ensured, and reliability of the fitting detection by the detection member 12 can be improved. In particular, in the case of this embodiment, since the lever 11 is a cantilever type installed only at the outer surface side of any of the opposing walls 40 and 41 among the outer surfaces of the opposing walls 40 and 41, the lever 11 is easily separated from the outer surface side of the opposing walls 40 and 41, and there is a significant advantage that the pressing portions 60 and 61 can suppress the floating up of the detection member 12.

The movement restricting portions 54 and 55 and the pressing portions 60 and 61 are collectively provided at the rear edge portion (protruding end portion) of the ribs 52 and 53 at the side facing the detection member 12. Therefore, the configuration of the connector body 10 can be simplified as compared with the case where the movement restricting portions 54 and 55 and the pressing portions 60 and 61 are provided at separate parts.

The connector body 10 has the movement paths 56 and 57 at the outer surface of the cover 16. The movement paths 56 and 57 face the end portions of the movement restricting portions 54 and 55 in the extension direction. The detection member 12 has the detection piece 84 arranged in the bending space 69 of the lock arm 31 at the detection position. Therefore, even if the detection member 12 slips through the movement restricting portions 54 and 55 and reaches a position facing the movement paths 56 and 57, the restriction surface 85 of the detection piece 84 abuts against the lock arm 31 which bendingly deforms into the bending space 69, whereby the movement of the detection member 12 to the detection position is restricted. Therefore, it is possible to suitably suppress the detection member 12 from unexpectedly moving to the detection position before the connector body 10 and the counterpart housing 14 are properly fitted.

Other Embodiments of this Disclosure

The embodiments disclosed herein should be considered in all respects illustrative and not restrictive.

In the case of the above-described embodiments, the detection member is arranged at one side in the width direction, among the two sides of the lock arm in the width direction, but in other embodiments, the detection member may also be arranged at the other side in the width direction, among the two sides of the lock arm in the width direction.

In the case of the above-described embodiments, the lock arm is configured to lock the housing, but in other embodiments, the lock arm may be configured to lock the counterpart housing.

In the case of the above-described embodiments, the lock arm is provided at the lever, but in other embodiments, the lock arm may be provided at the housing.

In the case of the above-described embodiments, the movement restricting portions are formed at the rear end edge of the rib, but in other embodiments, the movement restricting portions may be formed at the interior surface of the recess. When the movement restricting portions are formed at the interior surface of the recess, it is preferable that the movement restricting portions are formed on the end surface of the protruding portion of the engaging piece. Further, both the rear end edge of the rib and the interior surface of the recess may be a movement restricting portion.

In the case of the above-described embodiments, the movement restricting portions and the pressing portions are provided at the ribs, but in in other embodiments, the movement restricting portions and the pressing portions may be provided at separate portions.

In the case of the above-described embodiments, the pressing portions were configured to suppress the floating up of the detection member before the proper fitting of the connector body and the counterpart housing, but in other embodiments, the pressing portions may be configured to suppress the floating up of the detection member even after the connector body and the counterpart housing are properly fitted.

In the case of the above-described embodiments, the ribs and the like other than the first movement restricting portion and the second movement restricting portion also had a point-symmetrical shape centered at the center of the rear view of the cover, but in other embodiments, only the shape portions of the first movement restricting portion and the second movement restricting portion may have a point-symmetrical shape centered at the center of the rear view of the cover. In short, the shapes other than the first movement restricting portion and the second movement restricting portion do not have to be point-symmetrical.

In the case of the above-described embodiments, the first movement restricting portion and the second movement restricting portion, and the first pressing portion and the second pressing portion are provided at the cover, but in other embodiments, the first movement restricting portion and the second movement restricting portion, and the first pressing portion and the second pressing portion may be provided at the housing.

In the case of the above-described embodiments, the lever was supported by the housing, but in other embodiments, the lever may be supported by a wire cover.

The invention claimed is:

1. A connector comprising:

a housing;

a lock arm that holds the housing and a counterpart housing in a fitted state;

a detector that is in a state of being movable with respect to the lock arm when the housing and the counterpart housing are properly fitted; and a lever that advances a fitting of the housing and the counterpart housing, wherein:

the detector is arranged at one side surface among two side surfaces of the lock arm, the lock arm is provided at the lever, and the detector is held by the lever, the lever has a frame that covers the lock arm, and is rotated in a fitting direction when the fitting of the housing and the counterpart housing is advanced, the frame of the lever has a lever pressing surface that is exposed rearward in the fitting direction, the detector has a flat plate-shaped base and is movable in a detection direction with respect to the lock arm when the housing and the counterpart housing are properly fitted, the base of the detector has a detector pressing surface that is exposed rearward in the detection direction, and the lever pressing surface and the detector pressing surface face different directions from each other.

2. The connector according to claim 1, wherein:

the detector is in a state of being movable from the one side surface to another side surface among the two side surfaces with respect to the lock arm when the housing and the counterpart housing are properly fitted.

3. The connector according to claim 1, wherein:

a protective wall is placed at a side of the one side surface of the lock arm; and the protective wall has a mount that movably holds the detector.

* * * * *